(12) United States Patent
Yabe et al.

(10) Patent No.: US 8,344,581 B2
(45) Date of Patent: Jan. 1, 2013

(54) INDUCTION MOTOR ROTOR CORE HAVING SHAPED SLOTS

(75) Inventors: Koji Yabe, Chiyoda-ku (JP); Hayato Yoshino, Chiyoda-ku (JP); Kazuhiko Baba, Chiyoda-ku (JP); Tomoaki Oikawa, Chiyoda-ku (JP); Takahiro Tsutsumi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/034,229

(22) Filed: Feb. 24, 2011

(65) Prior Publication Data

US 2011/0140565 A1 Jun. 16, 2011

Related U.S. Application Data

(62) Division of application No. 12/744,622, filed as application No. PCT/JP2008/059127 on May 19, 2008.

(30) Foreign Application Priority Data

Dec. 27, 2007 (JP) ................................. 2007-335776

(51) Int. Cl.
  *H02K 1/16* (2006.01)
  *H02K 17/16* (2006.01)
  *H02K 17/18* (2006.01)

(52) U.S. Cl. ................. 310/216.069; 310/211; 310/212; 310/216.071

(58) Field of Classification Search ............ 310/211, 310/212, 216.069, 216.071
See application file for complete search history.

(56) References Cited

U.S. PATENT DOCUMENTS

| | | | |
|---|---|---|---|
| 980,986 | A | 1/1911 | Meyer |
| 1,650,795 | A | 11/1927 | Johnson |
| 1,708,909 | A | 4/1929 | Spencer |
| 1,771,936 | A | 7/1930 | Morrill |
| 1,957,551 | A | 5/1934 | Nierlich |
| 2,139,748 | A | 12/1938 | Harrell |

(Continued)

FOREIGN PATENT DOCUMENTS

JP 47-029503 U 12/1972

(Continued)

OTHER PUBLICATIONS

International Search Report (PCT/ISA/210) for PCT/JP2008/059127 dated Aug. 12, 2008.

(Continued)

*Primary Examiner* — Quyen Leung
*Assistant Examiner* — Jose Gonzalez Quinones
(74) *Attorney, Agent, or Firm* — Buchanan Ingersoll & Rooney PC

(57) ABSTRACT

To provide an indication motor rotor capable of improving motor performance by concentrating portions under magnetic saturation conditions of rotor teeth. The rotor of an induction motor of this invention may include slots formed approximately in the shape of a T. The slots may be formed so that top slots are arranged on an outer peripheral portion of a rotor core, and bottom slots are arranged on an inner side of the top slots. The width in the circumferential direction of the top slot is wider than the width in the circumferential direction of the bottom slot, and the width in the circumferential direction of a rotor tooth between adjacent top slots is narrower than the width in the circumferential direction of the rotor tooth between adjacent bottom slots.

2 Claims, 17 Drawing Sheets

U.S. PATENT DOCUMENTS

| | | | |
|---|---|---|---|
| 2,292,167 | A | 8/1942 | Smith |
| 2,370,458 | A * | 2/1945 | Goran |
| 3,401,291 | A * | 9/1968 | Lackey |
| 4,454,438 | A | 6/1984 | Yamashita et al. |
| 4,782,260 | A | 11/1988 | Gandhi et al. |
| 4,801,832 | A | 1/1989 | Neumann |
| 5,182,483 | A | 1/1993 | Hibino et al. |
| 5,334,923 | A | 8/1994 | Lorenz et al. |
| 5,572,080 | A | 11/1996 | Nakamura et al. |
| 5,898,250 | A | 4/1999 | Sugita et al. |
| 5,986,366 | A | 11/1999 | Bailey et al. |
| 6,058,596 | A | 5/2000 | Jansen et al. |
| 6,088,906 | A | 7/2000 | Hsu et al. |
| 6,582,207 | B2 | 6/2003 | Matsumoto et al. |
| 7,112,908 | B2 | 9/2006 | Takita et al. |
| 7,294,949 | B2 | 11/2007 | Han et al. |
| 2003/0071533 | A1 | 4/2003 | Kikuchi et al. |
| 2003/0102762 | A1 | 6/2003 | Jansen et al. |
| 2003/0173861 | A1 | 9/2003 | Kawaguchi et al. |
| 2004/0084984 | A1 | 5/2004 | Yanashima et al. |
| 2004/0119367 | A1 | 6/2004 | Hiwaki et al. |
| 2007/0247015 | A1 | 10/2007 | Dellinger |
| 2010/0247347 | A1 | 9/2010 | Yoshino et al. |
| 2010/0253174 | A1 | 10/2010 | Yabe et al. |
| 2011/0081263 | A1 | 4/2011 | Yoshino et al. |

FOREIGN PATENT DOCUMENTS

| | | | |
|---|---|---|---|
| JP | 51-071915 A | | 6/1976 |
| JP | 52039106 A | | 3/1977 |
| JP | 54-148207 A | | 11/1979 |
| JP | 54148207 A | * | 11/1979 |
| JP | 56-003559 A | | 1/1981 |
| JP | 58-176540 U | | 11/1983 |
| JP | 59-010159 A | | 1/1984 |
| JP | 60-162434 A | | 8/1985 |
| JP | 61-244248 A | | 10/1986 |
| JP | 62-068468 U | | 4/1987 |
| JP | 62-189929 A | | 8/1987 |
| JP | 63-234850 A | | 9/1988 |
| JP | 64-047565 U | | 3/1989 |
| JP | 01-129738 A | | 5/1989 |
| JP | 2-007771 U | | 1/1990 |
| JP | 02-41672 U | | 3/1990 |
| JP | 03-230740 A | | 10/1991 |
| JP | 04-244762 A | | 9/1992 |
| JP | 05-43753 U | | 6/1993 |
| JP | 06-153471 A | | 5/1994 |
| JP | 08-140319 | | 5/1996 |
| JP | 08-140319 A | | 5/1996 |
| JP | 08-205438 A | | 8/1996 |
| JP | 9-224358 A | | 8/1997 |
| JP | 10-004658 | | 1/1998 |
| JP | 10-004658 A | | 1/1998 |
| JP | 11-299188 A | | 10/1999 |
| JP | 2003-125567 A | | 4/2003 |
| JP | 2003-158839 A | | 5/2003 |
| JP | 2003-333812 A | | 11/2003 |
| JP | 2004-201428 A | | 7/2004 |
| KR | 10-2006-0027707 A | | 3/2006 |
| TW | 340983 | | 9/1998 |
| TW | 571487 B | | 1/2004 |

OTHER PUBLICATIONS

Office Action (Notice of Rejection) dated Nov. 2, 2010, issued in the corresponding Japanese Patent Application No. 2009-547920, and an English-language translation thereof.

Partial translation of JP 56-003559, originally cited in the IDS filed May 25, 2010.

Partial translation of JP 9-224358, originally cited in the IDS filed May 25, 2010.

Official Action dated Apr. 25, 2011, issued by the Korean Patent Office in corresponding Korean Patent Application No. 10-2010-7007521, and partial English language translation of the Offical Action.

Official Action dated Jul. 11, 2011, issued by the US Patent Office in corresponding U.S. Appl. No. 12/744,622.

Partial English translation of Taiwanese Office Action issued Nov. 9, 2011 in a corresponding Taiwanese application.

Official Action dated Jan. 9, 2012 issued in corresponding U.S. Appl. No. 12/742,718.

Official Action dated Nov. 4, 2011 issued in corresponding U.S. Appl. No. 12/744,622.

Partial translation of JP 8-205438A.

Partial translation of JP 10-4658A.

Office Action dated Aug. 25, 2011, issued in the corresponding Chinese Patent Application No. 200880100719.5, and an English Translation thereof.

Hayato Yoshino et al., "Induction Motor and Hermetic Compressor", copending U.S. Appl. No. 12/996,910, filed Dec. 8, 2010.

Office Action from U.S. Patent Office issued in copending U.S. Appl. No. 12/744,622 on Mar. 11, 2011.

International Search Report (PCT/ISA/210) for PCT/JP2008/063986 dated Nov. 18, 2008, corresponding to U.S. Appl. No. 12/996,910.

Notification of Reasons for Refusal issued Dec. 20, 2011 by the Japanese Patent Office in corresponding Japanese Patent Application No. 2009-550418, and English-language translation thereof.

Office Action dated Jan. 19, 2012, issued in the corresponding Taiwanese Patent Application No. 097128787, and a partial English Translation thereof. (10 pages).

Office Action issued by the Korean Patent Office on Mar. 9, 2012 in corresponding Korean Application No. 10-2011-7000213, and partial English-language translation thereof.

First Office Action issued by the Chinese Patent Office on Feb. 3, 2012 in corresponding Chinese Application No. 2008801106792, and a partial English-translation thereof.

Cao et al., "Influence of rotor slot and material on IMCCR operating performances", vol. 11, No. 6, No. 2007, and an English translation of portions particularly refferred to in the First Office Action issued on by the Chinese Patent Office on Feb. 3, 2012 in corresponding Chinese Application.

Office Action issued by the Japanese Patent Office on Apr. 24, 2012 in corresponding Japanese Application No. 2010-523665, and a partial translation thereof.

Partial English translation of JP 2003-158839A including parts in the Apr. 24, 2012 Japanese Office Action.

U.S. Office Action dated Apr. 26, 2012, issued in related U.S. Appl. No. 12/742,718.

Chinese Office Action dated Jun. 4, 2012, issued in a Chinese patent application corresponding to U.S. Appl. No. 12/742,718, with a partial English translation thereof.

Japanese Office Action dated Jun. 12, 2012, issued in a Japanese patent application corresponding to U.S. App. No. 12/742,718, with partial English translation thereof.

U.S. Office Action issued on Sep. 19, 2012 in corresponding U.S. Appl. No. 12/996,910. (9 pages).

Second Office Action issued on Sep. 24, 2012 by the Chinese Patent Office in corresponding Chinese Application No. 2008801106792, and an English translation thereof.

* cited by examiner

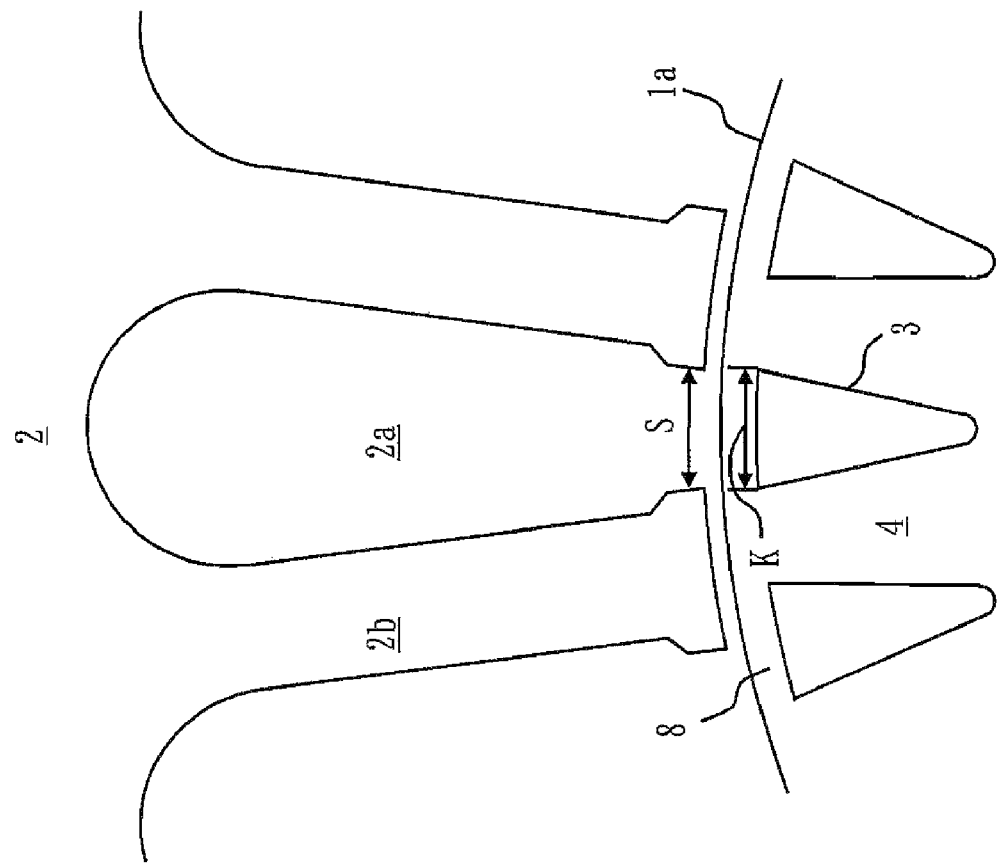

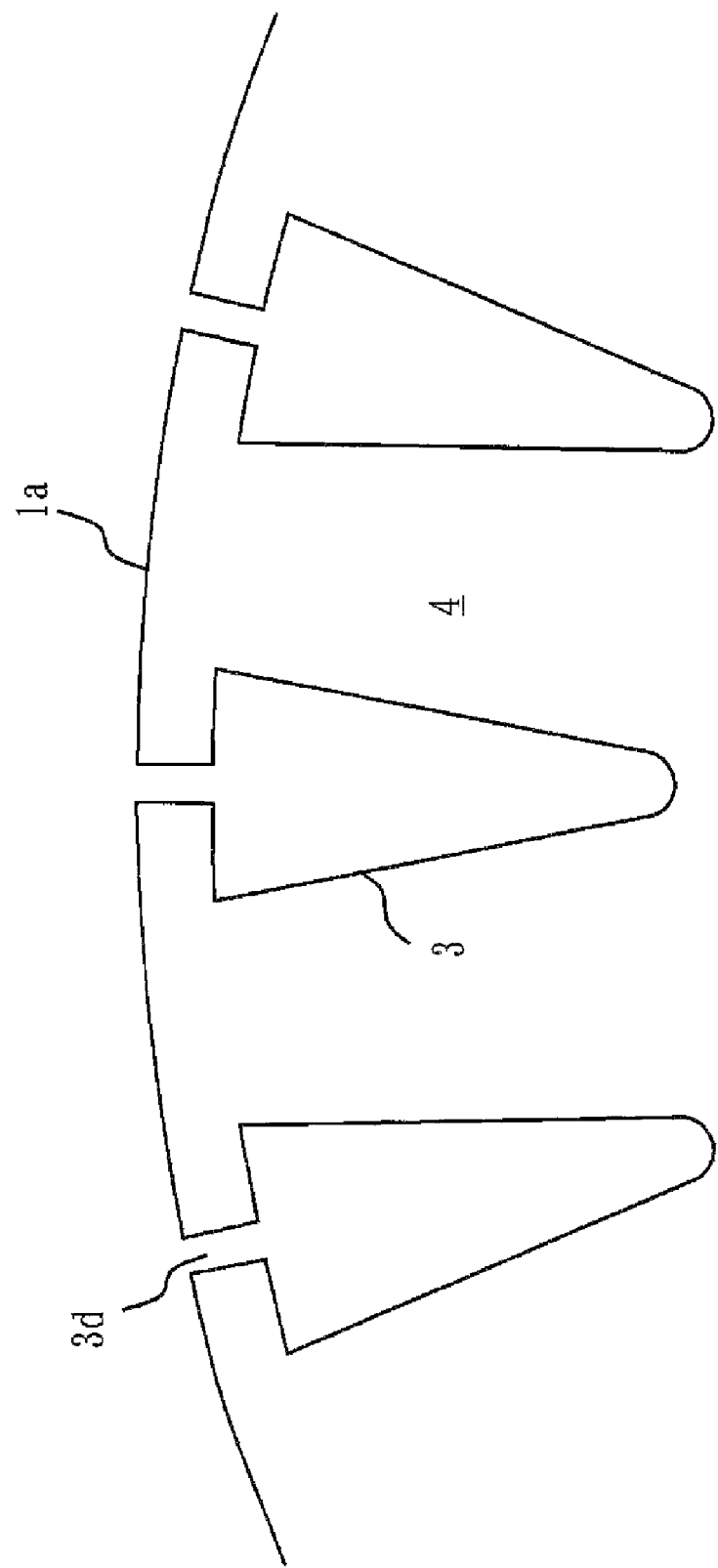

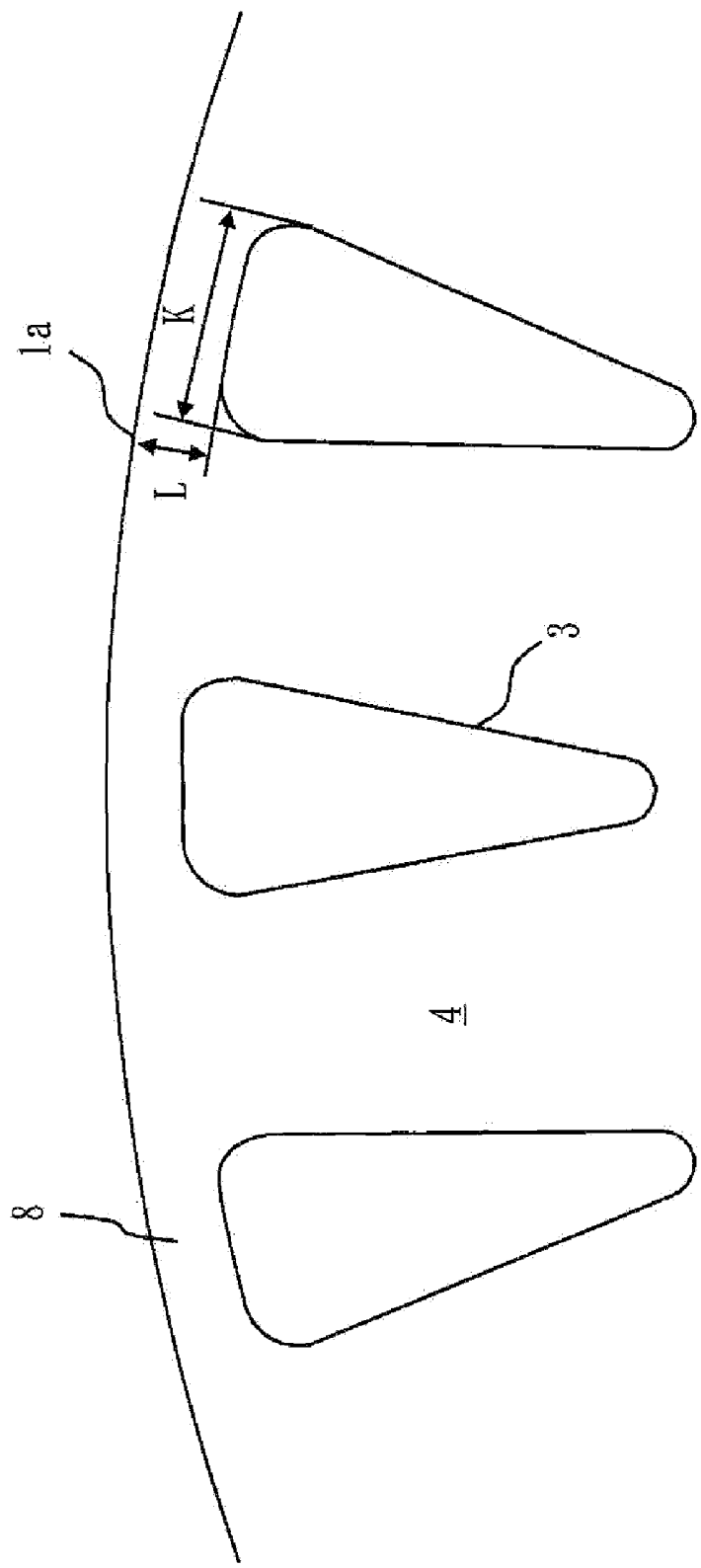

INDUCTION MOTOR ROTOR CORE HAVING SHAPED SLOTS

TECHNICAL FIELD

The present invention relates to an induction motor rotor, and more particularly to the shape of slots of the induction motor rotor. The present invention further relates to an induction motor using the induction motor rotor, a compressor and a fan that are equipped with the induction motor, and an air conditioner that is equipped with the compressor and the fan.

BACKGROUND ART

Various shapes of induction motor rotor have been proposed by the use of double squirrel-cage shapes or the like for the purpose of improving locked-rotor torque, breakdown torque, and efficiency.

As an example, a rotor for a rotating electrical machine having a double squirrel-cage rotor core has been proposed (see e.g., Patent Document 1). The double squirrel-cage rotor core is formed to have intermediate bars fitted in slit portions that connect outside slots and inside slots. The intermediate bars are narrow near the outside slots and wide near the inside slots.

Patent Document 1: Unexamined Japanese Utility Model Publication No. SHO 62-68468

DISCLOSURE OF THE INVENTION

Problems to be Solved by the Invention

The rotor described in Patent Document 1 is characterized by its double squirrel-cage shape and the shape of the intermediate bars designed to improve motor performance. However, the rotor is formed to have the slit portions connecting the outside slots on the outer side of the rotor and the inside slots on the inner side of the rotor. The slit portions cause the slots to extend towards the center of the rotor. The problem is that slot spaces cannot be extended in a well balanced design where the width of the rotor teeth (portions of the rotor core between slots) is fixed and thereby a constant density of magnetic flux of the rotor teeth is maintained.

The present invention is directed to solving problems as described above. It is an object of the present invention to provide an indication motor rotor, an induction motor, a compressor, a fan, and an air conditioner, which are capable of enhancing motor performance by concentrating portions of rotor teeth under magnetic flux saturation.

Means to Solve Problems

An induction motor rotor according to this invention may include a rotor core with slots formed therein, and a squirrel-cage secondary conductor having a nonmagnetic and conductive material filled in each of the slots of the rotor core. Each of the slots may be formed so that a width in the circumferential direction of a rotor tooth between adjacent slots is narrower on the outer peripheral side of the rotor core than on the center side of the rotor core.

An induction motor rotor according to this invention may include a rotor core with slots formed therein, and a squirrel-cage secondary conductor having a nonmagnetic and conductive material filled in each of the slots of the rotor core. Each of the slots may be formed approximately in the shape of a T, and include a top slot arranged at an outer peripheral portion of the rotor core and a bottom slot arranged on an inner side of the top slot. Each of the slots may be formed so that a width in the circumferential direction of the top slot is wider than a width in the circumferential direction of the bottom slot. Each of the slots may be formed so that a width in the circumferential direction of a rotor tooth between adjacent top slots is narrower than a width in the circumferential direction of the rotor tooth between adjacent bottom slots.

An induction motor rotor comprising according to this invention may include a rotor core with slots formed therein, and a squirrel-cage secondary conductor having a nonmagnetic and conductive material filled in each of the slots of the rotor core. Each of the slots may be formed approximately in the shape of a T, and include a top slot arranged at an outer peripheral portion of the rotor core and a bottom slot arranged on an inner side of the top slot, Each of the slots may be formed so that a width in the circumferential direction of the top slot is wider than a width in the circumferential direction of the bottom slot. Each of the slots may be formed so that a width in the circumferential direction of a rotor tooth between adjacent top slots is narrower than a width in the circumferential direction of the rotor tooth between adjacent bottom slots. Each of the slots may be formed to include a leakage slot between the top slot and the bottom slot. Each of the slots may be formed so that a width in the circumferential direction of the rotor tooth between adjacent leakage slots is wider than the width in the circumferential direction of the rotor tooth between the adjacent top slots and wider than the width in the circumferential direction of the adjacent bottom slots.

According to the induction motor rotor of this invention, A may be defined as a width in the radial direction of the top slot, B may be defined as a width in the radial direction of the bottom slot, and $A<0.5B$.

According to the induction motor rotor of this invention, A may be defined as a width in the radial direction of the top slot, C may be defined as the width in the circumferential direction of the top slot, and $A<0.5C$.

According to the induction motor rotor of this invention, the rotor core may be formed to layer electromagnetic steel sheets. A width in the radial direction of the leakage slot may be substantially equal to the thickness of an electromagnetic steel sheet.

An induction motor rotor according to this invention may include a rotor core with slots formed therein, and a squirrel-cage secondary conductor having a nonmagnetic and conductive material filled in each of the slots of the rotor core. Each of the slots may be formed to include a top slot, a middle slot, and a bottom slot, each of which communicates with an adjacent layer slot. A relation among a width in the circumferential direction of the top slot, a width in the circumferential direction of the middle slot, and a width in the circumferential direction of the bottom slot may be defined as: width in the circumferential direction of the top slot>width in the circumferential direction of the middle slot>width in the circumferential direction of the bottom slot. A relation among a width in the circumferential direction of the rotor tooth between adjacent top slots, a width in the circumferential direction of the rotor tooth between adjacent middle slots, and a width in the circumferential direction of the rotor tooth between adjacent bottom slots may be defined as: width in the circumferential direction of the rotor tooth between adjacent top slots<width in the circumferential direction of the rotor tooth between adjacent middle slots<width in the circumferential direction of the rotor tooth between adjacent bottom slots.

According to the induction motor rotor, G may be defined as a width in the radial direction of the top slot, H may be defined as a width in the radial direction of the middle slot, I may be defined as a width in the radial direction of the bottom slot, and G+H<0.5I.

The induction motor rotor according to this invention may further include a bridge between the top slot and the outer edge of the rotor core. A width in the radial direction of the bridge may be approximately fixed.

An induction motor rotor according to this invention may include a rotor core with slots formed therein, and a squirrel-cage secondary conductor having a nonmagnetic and conductive material filled in each of the slots of the rotor core. Each of the slots may be formed approximately in the shape of a triangle so that a width in the circumferential direction of a rotor tooth between adjacent slots increases towards the center of the rotor core. A width in the radial direction of a bridge between the slot and the outer peripheral edge of the rotor core may be approximately in a fixed workable minimum size.

According to the induction motor rotor, the width in the circumferential direction of the top slot may be wider than a width in the circumferential direction of an opening formed on an inner peripheral portion of a slot of a stator.

According to the induction motor rotor, the slot of the rotor core may include an opening that opens to outside at the outer edge of the rotor core.

An induction motor according to this invention may include the induction motor rotor described above.

A compressor according to this invention may include the induction motor described above.

A fan according to this invention may include the induction motor described above.

An air conditioner according to this invention may include the compressor described above.

Effects

An induction motor rotor of this invention may enhance induction motor performance by concentrating portions under magnetic saturation conditions by forming slots so that a width in the circumferential direction of a rotor tooth between adjacent slots on the outer peripheral side of a rotor core is narrower than a width in the circumferential direction of the rotor tooth between adjacent slots on the center side of the rotor core.

BEST MODE FOR IMPLEMENTING THE INVENTION

Embodiment 1

FIG. 1 and FIG. 2 are diagrams illustrating a conventional induction motor 100 for the purpose of comparison. FIG. 1 shows a cross section of a rotor 1 (including a stator 2) of the induction motor 100. FIG. 2 shows a perspective view of the rotor 1 where slots are filled with a nonmagnetic and conductive material (e.g., aluminum, copper, etc.) by die-casting or the like, end rings 7 are fitted at the end portions of the rotor 1.

The cross sectional view of the induction motor 100 of FIG. 1 includes omissions of the winding, etc. of the stator 2.

The stator 2 is formed like a ring with a plurality of slots 2a and teeth 2b between slots 2a formed on the inner peripheral side. The outer peripheral side of the stator 2 is a core back 2c as a flux path. The rotor 1 is placed inside the stator 2 with an air-gap in between.

The configuration of a rotor core 1a of the rotor 1 is now described. The rotor core 1a is formed to include a plurality of slots 3 with rotor teeth 4 arranged between adjacent slots 3 on the outer peripheral side. A shaft hole 6 is provided at a center portion of the rotor core 1a to allow a drive shaft (not shown in the figures) to fit in. A portion of the rotor core between the slots 3 and the shaft hole 6 is called a core back.

In the rotor 1, aluminum or the like is cast in the slots 3 to form a squirrel-cage secondary conductor or a squirrel-cage winding. The squirrel-cage winding is formed so that a plurality of aluminum bars formed in the slots 3 is mutually short-circuited at each by means of an end ring 7 (see FIG. 2) at the both ends.

With the conventional rotor 1 of FIG. 1, the width in the circumferential direction of the rotor teeth 4 formed between the slots 3 arranged in the circumferential direction of the rotor 1 is fixed. This allows the rotor teeth 4 to maintain a constant density of magnetic flux, as a well balanced design. In this case, the shape of the slots 3 has a width in the circumferential direction gradually reduced from the outside towards the inside.

However, efficiency is increased by reducing secondary resistance (the resistance of the squirrel-cage secondary conductor of the rotor 1). Therefore, if the width in the circumferential direction of the slot 3 is increased so as to extend the space of the slot 3, then the width in the circumferential direction of the rotor tooth 4 is reduced. For this reason, the magnetic saturation of the rotor teeth 4 causes the lowering effect of secondary resistance to be reduced.

Another method for improving the efficiency uses the slots 3 in the shape of a double squirrel-cage. This method has the following characteristics. As a general characteristic of an induction motor using a double squirrel-cage rotor, slip frequency is high when the induction motor is started. Therefore, magnetic flux flows on the outer peripheral side of the rotor, and a secondary current flows exclusively through top slots with high resistance, thereby increasing locked-rotor torque. During a normal operation, slip frequency is low and therefore a secondary current flows through both top slots and bottom slots. This reduces secondary resistance and secondary copper loss, thereby enhancing efficiency.

However, the double squirrel-cage rotor is generally formed to include leakage slots between top slots and bottom slots. Accordingly, slots are extended towards the center of the rotor. Therefore, it is difficult to apply a double squirrel-cage slot in the case where the slots cannot be extended towards the center of the rotor due to wind holes and a drive shaft.

FIG. 3 to FIG. 9 illustrate a first embodiment. FIG. 3 is an enlarged partial top view of the slot 3 in the shape of a T of the rotor core 1a. FIG. 4 is an enlarged partial top view of the slot 3 in the shape of a double squirrel-cage. FIG. 5 is an enlarged partial top view of the rotor core 1a illustrating an outer peripheral portion (including the stator 2). FIG. 6 is an enlarged partial top view of the slot 3 in the shape of a double squirrel-cage. FIG. 7 is an enlarged partial top view of the slot 3 in the shape of a T of the rotor core 1a, as a variant example. FIG. 8 is an enlarged top view of the slot 3 in the shape of a double squirrel-cage, as a variant example. FIG. 9 is an enlarged partial top view of the slot 3 in the shape of a double squirrel-cage for more detail.

FIG. 3 shows the slots 3 formed in the shape of a T. The slot 3 is formed to include a top slot 3a and a bottom slot 3b. The top slot 3a with a wider width in the circumferential direction is arranged in an outer peripheral portion of the rotor core 1a. The bottom slot 3b with a narrower width in the circumferential direction is arranged on an inner side of the top slot 3a (on the center side of the rotor core 1a). That is, the width in the circumferential direction of the bottom slot 3b is narrower than the width in the circumferential direction of the top slot 3a. The top slot 3a and the bottom slot 3b are directly connected.

With the slot 3 in the shape of a T, the width in the circumferential direction of the rotor teeth 4 between adjacent slots 3 is narrower at an outer peripheral portion than on the internal side of the rotor 1. More specifically, the width in the circumferential direction of the rotor tooth 4 between adjacent top slots 3a is narrower than the width in the circumferential direction of the rotor tooth 4 between adjacent bottom slots 3b. It should be noted that the width in the circumferential direction of the rotor teeth 4 between adjacent top slots 3a and the width in the circumferential direction of the rotor teeth 4 between adjacent bottom slots 3b may be defined as a minimum tooth width between adjacent top slots 3a and a minimum tooth width between adjacent bottom slots 3b, respectively.

Thus, the slot 3 in the shape of a T of FIG. 3 may be formed to reduce the width in the circumferential direction of one part of the rotor tooth 4 (between adjacent top slots 3a) and increase the width in the circumferential direction of the other part of the rotor tooth 4 (between adjacent bottom slots 3b). This may help to concentrate portions under magnetic saturation conditions to one part of the rotor tooth 4 (between adjacent top slots 3a), and thereby reduce magnetic saturation at other parts of the rotor tooth 4 (between adjacent bottom slots 3b).

If the entire rotor tooth 4 is under magnetic saturation conditions, then the total magnetic permeability of the rotor tooth 4 is reduced. If the slot 3 is formed in the shape of a T, however, magnetic saturation concentrates to one part of the rotor tooth 4 (between the top slots 3a). This may help to reduce the length (in the radial direction) of a portion of low magnetic permeability, and consequently improve the efficiency of motor performance.

FIG. 4 shows a possible example where the slots 3 are formed in the shape of a double squirrel-cage that connects the top slots 3a and the bottom slots 3b by leakage slots 3c. The width in the circumferential direction of the rotor teeth 4 between adjacent leakage slots 3c is wider than the width in the circumferential direction of the rotor teeth 4 between adjacent top slots 3a and wider than the width in the of the rotor teeth 4 between adjacent bottom slots 3b. It should be noted that the width in the circumferential direction of the rotor tooth 4 between adjacent leakage slots 3c may be defined as a maximum tooth width between adjacent leakage slots 3c.

With reference to FIG. 3 and FIG. 4, the size of each part of the slot 3 may be defined as follows:
A: a width in the radial direction of the top slot 3a
B: a width in the radial direction of the bottom slot 3b
C: a width in the circumferential direction of the top slot 3a
P: a width in the radial direction of the leakage slot 3c
L: a width in the radial direction of a bridge 8

A relation between A and B may be defined as follows.

$$A < 0.5B \tag{1}$$

In this expression, the width in the radial direction of the rotor tooth 4 between adjacent top slots 3a (the width in the radial direction A of the top slot 3a) to which magnetic saturation is concentrated is narrower than ½ of the width in the radial direction of the rotor tooth 4 between adjacent bottom slots (the width in the radial direction B of the bottom slot 3b) where magnetic saturation is reduced. If A is greater than ½ of B, then the length of a portion to which magnetic saturation is concentrated is increased, thereby thus resulting in an adverse effect on efficiency. For this reason, A may be less than ½ of B so as to reduce the length of the portion to which magnetic saturation is concentrated. This may help to reduce the influence of the magnetic saturation of the rotor tooth 4 between top slots 3a on motor performance. Hence, the efficiency of motor performance may be improved.

A relation between A and C may be defined as follows.

$$A < 0.5C \tag{2}$$

In this expression, the width in the circumferential direction C of the top slot 3a is more than twice the width in the radial direction A of the top slot 3a. More specifically, the length in the circumferential direction of the bridge 8 at the outer peripheral portion of the rotor core 1a is more than twice the width in radial direction A of the outré layer slot 3a. Therefore, if the rotor tooth 4 between the top slots 3a is under magnetic saturation conditions, the bridge 8 is substantially longer than the rotor tooth between the top slots 3a, because C is more than twice A. This may prevent magnetic flux from leaking to the bridge 8. Hence, magnetic flux may be used effectively.

The bridge 8 is formed thin so as to reduce the amount of magnetic flux leakage at the outer peripheral portion of the rotor core 1a. The width in the radial direction L of the bridge 8 may be defined as a workable minimum size (in which an electromagnetic steel sheet is durable in punching process). Generally, the workable minimum size allowing an electromagnetic steel sheet to be processed in punching process is substantially equal to the thickness of the electromagnetic steel sheet. The thickness of an electromagnetic steel sheet is around 0.1 mm to 1.5 mm. If the width in the radial direction L of the bridge 8 is fixed by the workable minimum size, then the amount of magnetic flux leakage may be reduced. Hence, magnetic flux may be used effectively.

FIG. 5 shows a case where the width in the circumferential direction C of the top slot 3a is wider than a width in the circumferential direction S of a slot opening of the slot 2a of the stator 2. This may help to reduce the amount of magnetic flux leakage (a portion of magnetic flux generated by the winding of the stator 2 that does not link to the slots 3 of the rotor 1). Hence, magnetic flux may be used effectively.

If a fixed portion of the width in the radial direction L of the bridge 8 is wider than the width in the circumferential direction S of the slot opening, then magnetic flux may be used further effectively.

The use of the leakage slot 3c arranged between the top slot 3a and the bottom slot 3b of FIG. 4 may allow the rotor to perform as a double squirrel-cage rotor. However, if the width in the radial direction P of the leakage slot 3c is wider than appropriate, then the space of the bottom slot 3b is reduced when the width in the radial direction of the slot 3 is fixed. Accordingly, the space of the slot 3 is reduced as a whole. This may result in increasing the secondary resistance of the rotor 1. If the secondary resistance is increased, then the efficiency of motor performance is reduced.

Therefore, it is preferable that the width in the radial direction P of the leakage slot 3c is as narrow as possible. Generally, the workable minimum size of the width in the radial direction P of the leakage slot 3c is substantially equal to the thickness of an electromagnetic steel sheet (0.1 mm to 1.5 mm) forming the rotor core 1a. The width in the radial direction P of the leakage slot 3c may therefore be set to a size substantially equal to the thickness of the electromagnetic steel sheet. This may allow the rotor to perform as a double squirrel-cage rotor without increasing the secondary resistance of the rotor 1.

FIG. 6 shows an effective example where the slots 3 of the rotor core 1a are modified by adding slot openings. The slot 3 of FIG. 6 is formed to add an opening 3d to the top slot 3a extending towards the peripheral edge of the rotor core 1a.

The additional opening 3d to the slot 3 helps to reduce the amount of magnetic flux leakage (a portion of magnetic flux generated by the winding of the stator core that does not link to the slots 3 of the rotor 1). Therefore, magnetic flux may be used effectively. Hence, the efficiency of motor performance may be improved.

With reference to FIG. 3, FIG. 4, and FIG. 6, the top slots 3a are in the shape of a rectangle. FIG. 7 shows a case where the top slots 3a is formed in the shape of an ellipse. FIG. 8 shows a case where the bottom slots 3b have rounded corners in addition to the top slots 3a in the shaped of an ellipse. These configurations may help a die to improve punching performance, thereby enhancing productivity. It may be difficult to fill the slots 3 at corners with a nonmagnetic and conductive material (e.g., aluminum, copper, etc.) if the top slots 3 are rectangular in shape. The top slots 3a in the shape of an ellipse with rounded corners may help to enhance filling efficiency. This may also help to concentrate portions under magnetic saturation conditions, that is, the length in the radial direction of a portion of the rotor tooth 4 under magnetic saturation conditions is reduced. Hence, the efficiency of motor performance may be improved.

FIG. 9 shows a case where the slot 3 is formed to satisfy θ1>θ2 according to this embodiment, where θ1 denotes an angle formed by the both side surfaces of the top slot 3a and the center of the rotor core 1a, and θ2 denotes an angle formed by the sides of adjacent top slots 3a facing each other and the center of the rotor core 1a. The bottom slots 3b are formed within θ1, i.e., the angle formed by the top slot 3a.

The slots 3 thus formed may allow the induction motor 100 to have well balanced locked-rotor torque, breakdown torque (maximum torque) and operation efficiency.

To increase locked-rotor torque, it is effective to increase secondary resistance by reducing the area of cross section of the top slot 3a. However, to increase efficiency during normal operation, it is necessary to reduce secondary resistance by both the top slot 3a and the bottom slot 3b, and thereby reduce secondary copper loss.

To increase locked-rotor torque, it is preferable to reduce θ1 so as to reduce the area of cross section of the top slot 3a. However, if the area of cross section of the top slot 3a is reduced, secondary resistance during normal operation is increased. If the length of the bottom slot 3b is increased towards the center of the rotor core 1a, then the area of cross section of the bottom slot 3b may be increased. However, the width of the slot 3 becomes narrower towards the center of the rotor core 1a (if the width in the circumferential direction of the rotor tooth 4 is fixed). In order to obtain a desired area of cross section under this situation, the bottom slot 3b may sometimes get too close to the rotary shaft. If the length of the bottom slot 3b is increased, then the length of the rotor tooth 4 with high magnetic density in the rotor is increased. This may cause inefficiency.

Furthermore, since the width of the slot 3 is reduced towards the center of the rotor core 1a, it is difficult to fill the bottom slot 3b with aluminum by die casting at a center portion of the rotor core 1a. Consequently, secondary resistance cannot be reduced, resulting in possible inefficiency of motor performance.

As another approach, a desired area of cross section of the slot 3 may be obtained by increasing the width in the circumferential direction of the bottom slot 3b. However, if the width in the circumferential direction of the bottom slot 3b is increased, the tooth width (the width in the circumferential direction of the rotor tooth 4) as a passage of magnetic flux during normal operation is reduced. If the tooth width is reduced, then magnetic resistance is increased. This may result in increasing the amount of electric current required for obtaining torque during normal operation. This poses a problem of inefficiency of motor performance.

As described earlier, the following effects may be observed according to this embodiment.

(1) The slot 3 may be formed in the shape of a T. This may concentrate magnetic saturation to one place of one part of the rotor tooth 4 (between adjacent top slots 3a). Therefore, the length of a portion of low magnetic permeability is reduced, thereby resulting in improving the efficiency of motor performance.

(2) The same effect may be observed by forming the slot 3 in the shape of a double squirrel-cage where the top slot 3a and the bottom slot 3b are connected by the leakage slot 3c.

(3) A relation between the width in the radial direction A of the top slot 3a and the width in the radial direction B of the bottom slot 3b may be defined by A<0.5B. This may help to reduce the influence of magnetic saturation of the rotor teeth 4 between adjacent top slots 3a on motor performance.

(4) A relation between the width in the radial direction A of the top slot 3a and the width in the circumferential direction C of the top slot 3a may be defined by A<0.5C. This may help to prevent magnetic flux from leaking to the bridge 8 if the rotor tooth 4 between adjacent top slots 3a are under magnetic saturation conditions. Hence, magnetic flux may be used effectively.

(5) The width in the radial direction L of the bridge 8 may be fixed with the workable minimum size (around 0.1 mm-1.5 mm equal to the thickness of an electromagnetic steel sheet). This may help to reduce the amount of magnetic flux leakage. Hence, magnetic flux may be used effectively.

(6) The width in the circumferential direction C of the top slot 3a may be wider than the width in the circumferential direction S of the slot opening of the slot 2a of the stator 2. This may help to reduce the amount of magnetic flux leakage (a portion of magnetic flux generated by the winding of the stator 2 that does not link to the slot 3 of the rotor 1). This may contribute to an effective use of magnetic flux.

(7) Portions having the fixed width in the radial direction L of the bridge 8 may be wider than the width in the circumferential direction S of the slot opening. This may contribute to a further effective use of magnetic flux.

(8) The width in the radial direction P of the leakage slot 3c may be substantially equal to the thickness of an electromagnetic steel sheet. This may help to allow the rotor 1 to perform as a double squirrel-cage rotor without increasing secondary resistance.

(9) The slot 3 may be formed to include the opening 3d. This may help to reduce the amount of magnetic flux leakage (a portion of magnetic flux generated by the winding of the stator 2 that does not link to the slot 3 of the rotor 1), and therefore contribute to an effective use of magnetic flux. Hence, the efficiency of motor performance may be improved.

(10) The slot 3 of FIG. 7 includes the top slot 3a in the shape of an ellipse. The slot 3 of FIG. 8 modifies the slot 3 of FIG. 7 by making the bottom slot 3b rounded at the corners on the outer peripheral side. This may improve the punching performance of a die, thereby enhancing productivity. In addition to that, filling efficiency may also be improved without angular corners when the slots 3 are filled with a nonmagnetic and conductive material. This may also help to concentrate portions under magnetic saturation conditions. Hence, the efficiency of motor performance may be improved.

(11) The rotor core 1a may be formed to satisfy θ1>θ2 where θ1 denotes the angle formed by the both side surfaces of the top slot 3a and the center of the rotor core 1a, and θ2 denotes the angle formed by the side surfaces of adjacent top slots 3a facing each other and the center of the rotor core 1a. This may allow the induction motor 100 to obtain well balanced locked-rotor torque, breakdown torque (maximum torque) and operation efficiency.

Embodiment 2

FIG. 10 to FIG. 13 illustrate a second embodiment. FIG. 10 is an enlarged partial top view of the slot 3 of the rotor core 1a, including a top slot, a middle slot, and a bottom slot. FIG. 11 is an enlarged partial top view of the rotor core 1a illustrating an outer peripheral portion (including the stator 2). FIG. 12 is an enlarged partial top view of the slot 3 of the rotor core 1a, including a top slot, a middle slot and a bottom slot, as a variant example. FIG. 13 is an enlarged partial top view of the slot 3 of the rotor core 1a, including a top slot, a middle slot and a bottom slot, as another variant example.

FIG. 10 shows the slots 3 of the rotor core 1a that include the top slots 3a, middle slots 3e, and the bottom slots 3b. The slots are joined together. A relation among the width in the circumferential direction of the top slot 3a, the width in the circumferential direction of the middle slot 3e, and the width in the circumferential direction of the bottom slot 3b may be as follows: width in the circumferential direction of the top slot 3a>width in the circumferential direction of the middle slot 3e>width in the circumferential direction of the bottom slot 3b. A relation among the width in the circumferential direction of the rotor tooth 4 between adjacent top slots 3a, the width in the circumferential direction of the rotor tooth 4 between adjacent middle slots 3e, and the width in the circumferential direction of the rotor tooth 4 between adjacent bottom slots 3b may be as follows: width in the circumferential direction of the rotor tooth 4 between adjacent top slots 3a<width in the circumferential direction of the rotor tooth 4 between adjacent middle slots 3e<width in the circumferential direction of the rotor tooth 4 between adjacent bottom slots 3b. It should be noted that the widths in the circumferential direction of the rotor tooth 4 between adjacent top slots 3a, between adjacent middle slots 3e, and between adjacent bottom slots 3b may be defined as minimum tooth widths between the respective layer slots.

Therefore, the rotor tooth 4 is formed to have a narrower width in the circumferential direction on the outer peripheral side than on the inner peripheral side.

As described in the first embodiment, the width in the circumferential direction of a part of the rotor tooth 4 may be reduced, and the width in the circumferential direction of the other part of the rotor tooth 4 may be increased. This may help to concentrate portions under magnetic saturation conditions, and thereby reduce magnetic saturation on the other part of the rotor tooth 4. This may prevent the entire rotor teeth 4 from magnetic saturation. Magnetic saturation may be concentrated only on a part of the rotor tooth 4. Therefore, the length of a portion of low magnetic permeability may be reduced, thereby thus improving the efficiency of motor performance. The rotor teeth 4 may also be formed to have three layers as shown in FIG. 10. This may further distribute magnetic saturation, thereby also improving the efficiency of motor performance.

The size of each portion of the slot of FIG. 10 may be defined as follows:
G: a width in the radial direction of the top slot 3a
H: a width in the radial direction of the middle slot 3e
I: a width in the radial direction of the bottom slot 3b
D: a width in the circumferential direction of the top slot 3a
L: a distance between the top slot 3a and the outer peripheral edge of the rotor core 1a A relation among G, H, and I may be defined as follows.

$$G+H<0.5I \quad (3)$$

That is, the sum of the width in the radial direction of the rotor tooth 4 between adjacent top slots 3a where magnetic saturation is concentrated (the width in the radial direction G of the top slot 3a) and the width in the radial direction of the rotor tooth 4 between adjacent middle slots 3e (the width in the radial direction H of the middle slot 3e) is narrower than ½ the width in the radial direction of the rotor tooth 4 between adjacent bottom slots 3b where magnetic saturation is concentrated (the width in the radial direction I of the bottom slot 3b). Consequently, the influence of magnetic saturation on the rotor teeth 4 between adjacent top slots 3a and between adjacent middle slots 3e may be reduced on motor performance, as described in the first embodiment.

A relation between G+H and D may be defined as follows.

$$G+H<0.5D \quad (4)$$

That is, the width in the circumferential direction D of the top slot 3a is more than twice the sum of the width in the radial direction G of the top slot 3a and the width in the radial direction H of the middle slot 3e. More specifically, the length in the circumferential direction of the bridge 8 at the outer peripheral portion of the rotor core 1a is more than twice the sum of the width in the radial direction G of the top slot 3a and the width in the radial direction H of the middle slot 3e. This may prevent magnetic flux from leaking to the bridge 8 if the rotor tooth 4 between adjacent top slots 3a and between adjacent middle slots 3e is under magnetic saturation conditions, as discussed in the first embodiment. Hence, magnetic flux may be used effectively.

Like the first embodiment, the bridge 8 is formed thin so as to reduce the amount of magnetic flux leakage to the outer peripheral portion of the rotor core 1a. The width in the radial direction L of the bridge 8 is defined as the workable minimum size (in which an electromagnetic steel sheet is durable in punching process). Generally, the workable minimum size in which an electromagnetic steel sheet is durable in punching process is substantially equal to the thickness of an electromagnetic steel sheet. An electromagnetic steel sheet is around 0.1 mm to 1.5 mm in thickness. If the width in the radial direction L of the bridge 8 is fixed with the workable minimum size, then the amount of magnetic flux leakage may be reduced. This may contribute to an effective use of magnetic flux.

FIG. 11 shows a case where the width in the circumferential direction D of the top slot 3a is wider than the width in the circumferential direction S of the slot opening of the slot 2a of the stator 2. This may help to reduce the amount of magnetic flux leakage (a portion of magnetic flux generated by the winding of the stator 2 that does not link to the slot 3 of the rotor 1). Hence, magnetic flux may be used effectively.

A portion having the fixed width in the radial direction L of the bridge 8 may be wider than the width in the circumferential direction S of the slot opening. This may contribute to a further effective use of magnetic flux.

FIG. 12 shows a case where the slots 3 of the rotor core 1a are modified to become open slots, which is also effective.

The slot 3 is formed to include the opening 3d extending from the top slot 3a through the outer edge of the rotor core 1a.

The opening 3d added to the slot 3 may help to reduce the amount of magnetic flux leakage (a portion of magnetic flux generated by the winding of the stator 2 that does not link to the slot 3 of the rotor 1). This may contribute to an effective use of magnetic flux. Hence, the efficiency of motor performance may be improved.

FIG. 13 shows a case where the top slot 3a and the middle slot 3e are formed in the shape of an ellipse while those of FIG. 10 to FIG. 12 are in the shape of a rectangle. The top slot 3a and the middle slot 3e of FIG. 13 may improve the punching performance of a die, and thereby enhance productivity. Furthermore, the top slots 3a and the middle slots 3e of a rectangular shape may cause a difficulty in filling the slots 3 with a nonmagnetic and conductive material (e.g., aluminum, copper, etc.) at angular corners. The top slot 3a and the middle slot 3e in the shape of an ellipse may help to improve filling efficiency without angular corners. Additionally, portions under magnetic saturation conditions may be more concentrated (i.e., the length in the radial direction of a portion of the rotor tooth 4 under magnetic saturation conditions is reduced). This may more improve the efficiency of motor performance.

As described earlier, the following effects may be observed according to this embodiment.
(1) The slot 3 may be formed to include the top slot 3a, the middle slot 3e and the bottom slot 3b, each of which is connected with an adjacent layer slot, and satisfy the following relation: width in the circumferential direction of the top slot 3a>width in the circumferential direction of the middle slot 3e>width in the circumferential direction of the bottom slot 3b. The slot 3 may also be formed to satisfy the following relation: width in the circumferential direction of the rotor tooth 4 between adjacent top slots 3a<width in the circumferential direction of the rotor tooth 4 between adjacent middle slots 3e<width in the circumferential direction of the rotor tooth 4 between adjacent bottom slots 3b. If the slot 3 is thus formed, then magnetic saturation may be concentrated to one part of the rotor tooth 4 (between adjacent top slots 3a and between adjacent middle slots 3e). This may help to reduce the length of a portion of low magnetic permeability. Hence, the efficiency of motor performance may be improved.
(2) The relation between the width in the radial direction I of the bottom slot 3b and the sum of the width in the radial direction G of the top slot 3a and the width in the radial direction H of the middle slot 3e may be defined as G+H<0.5I. This may help to reduce the influence of magnetic saturation of the rotor teeth 4 between adjacent top slots 3a and between adjacent middle slots 3e on motor performance.
(3) The relation between the width in the circumferential direction D of the top slot 3a and the sum of the width in the radial direction G of the top slot 3a and the width in the radial direction H of the middle slot 3e may be defined as G+H<0.5D. This may prevent magnetic flux from leaking to the bridge 8 if the rotor teeth 4 are under magnetic saturation conditions between adjacent top slots 3a and between adjacent middle slots 3e. Hence, magnetic flux may be used effectively.
(4) The width in the radial direction L of the bridge 8 may be fixed with the workable minimum size (around 0.1 mm to 1.5 mm equal to the thickness of an electromagnetic steel sheet). This may help to reduce the amount of magnetic flux leakage. Hence, magnetic flux may be used effectively.
(5) The width in the circumferential direction D of the top slot 3a may be wider than the width in the circumferential direction S of the slot opening of the slot 2a of the stator 2. This may help to reduce the amount of magnetic flux leakage (a portion of magnetic flux generated by the winding of the stator 2 that does not link to the slot 3 of the rotor 1). Hence, magnetic flux may be used effectively.
(6) The portion having the fixed width in the radial direction L of the bridge 8 may be wider than the width in the circumferential direction S of the slot opening. This may contribute to a further effective use of magnetic flux.
(7) The slot 3 may be formed to include the opening 3d. This may help to reduce the amount of magnetic flux leakage (a portion of magnetic flux generated by the winding of the stator 2 that does not link to the slot 3 of the rotor 1). This may contribute to an effective use of magnetic flux. Hence, the efficiency of motor performance may be improved.
(8) The top slot 3a and the middle slot 3e may be formed in the shape of an ellipse. This may help to improve the punching performance of a die, and thereby enhance productivity. This may also help to improve filing efficiency for the slots when filled with a nonmagnetic and conductive material (e.g., aluminum, copper, etc.), by eliminating angular corners. This may also help to further concentrate portions under magnetic saturation conditions. Hence, the efficiency of motor performance may be further enhanced.

Embodiment 3

FIG. 14 to FIG. 17 illustrate a third embodiment. FIG. 14 is an enlarged partial top view of the slot 3 of the rotor core 1a formed approximately in the shape of a triangle so that the width of a rotor tooth 4 between adjacent slots 3 increases towards the center of the rotor core 1a. FIG. 15 is an enlarged partial top view of the rotor core 1a illustrating an outer peripheral portion (including the stator 2). FIG. 16 is an enlarged partial top view of the slot 3 of the rotor core 1a formed approximately in the shape of a triangle so that the width of the rotor tooth 4 between adjacent slots 3 increases towards the center of the rotor core 1a, as a variant example. FIG. 17 is an enlarged partial top view of the slot 3 of the rotor core 1a formed approximately in the shape of a triangle so that the width of the rotor tooth 4 between adjacent slots 3 increases towards the center of the rotor core 1a, as a variant example.

FIG. 14 shows the slots 3 formed approximately in the shape of a triangle so that the width in the circumferential direction of the rotor tooth 4 between adjacent slots 3 increases towards the center of the rotor core 1a. More specifically, a width in the circumferential direction J1 of the rotor tooth 4 on the peripheral side is narrower than a width in the circumferential direction J2 of the rotor tooth 4 on the center side of the rotor core 1a.

The slot 3 of FIG. 14 is formed so that width L of the bridge 8 between the slot 3 and the outer peripheral edge of the rotor core 1a is fixed.

As described in the first embodiment, the width in the circumferential direction of a part of the rotor tooth 4 may be reduced, and the width in the circumferential direction of the other part of the rotor tooth 4 may be increased. This may help to concentrate portions under magnetic saturation conditions, and thereby reduce magnetic saturation on the other part of the rotor tooth 4. This may prevent the entire rotor teeth 4 from magnetic saturation. Magnetic saturation may be concentrated only on a part of the rotor tooth 4. Therefore, the length of a portion of low magnetic permeability may be reduced, and consequently the efficiency of motor performance may be improved. As shown in FIG. 14, the width in the circumferential direction of the rotor tooth 4 may be gradually increased towards the center of the rotor core 1a. This may allow the magnetic density of the rotor tooth 4 to be reduced towards the center of the rotor core 1a, thereby distributing magnetic saturation. Hence, the efficiency of motor performance may be further improved.

Additionally, the width in the radial direction L of the bridge 8 between the rotor tooth 4 and the outer peripheral edge of the rotor core 1a may be fixed. This may help to reduce the amount of magnetic flux leakage from the outer peripheral portion of the rotor core 1a. This may contribute to a highly efficient operation.

FIG. 15 shows a case where a width in the circumferential direction K of the slot 3 on the outer peripheral side may be wider than the width in the circumferential direction S of the slot opening of the slot 2a of the stator 2. This may help to reduce the amount of magnetic flux leakage (a portion of magnetic flux generated by the winding of the stator 2 that does not link to the slot 3 of the rotor 1). This may contribute to an effective use of magnetic flux.

A portion having the fixed width in the radial direction L of the bridge 8 may be wider than the width in the circumferential direction S of the slot opening of the stator 2. This may contribute to a further effective use of magnetic flux.

FIG. 16 shows an effective example where the slots 3 of the rotor core 1a are modified by adding slot openings. The slot 3 of FIG. 16 is formed to add an opening 3d to the top slot 3a extending towards the peripheral edge of the rotor core 1a.

The opening 3d added to the slot 3 may help to reduce the amount of magnetic flux leakage (a portion of magnetic flux generated by the winding of the stator 2 that does not link to the slot 3 of the rotor 1). This may contribute to an effective use of magnetic flux. Hence, the efficiency of motor performance may be improved.

FIG. 17 shows a case where the slots 3 are formed to have rounded corners at both ends on the outer peripheral side of the rotor core 1a while the slots 3 of FIG. 14 to FIG. 16 are formed with acute-angled corners. The slots 3 of FIG. 17 may improve the punching performance of a die, thereby enhancing productivity. Furthermore, the top slots 3a and the middle slots 3e with acute-angled corners on both sides may cause a difficulty in filling the slots 3 with a nonmagnetic and conductive material (e.g., aluminum, copper, etc.) at angular corners. The slots 3 with rounded corners may help to improve filling efficiency without angular corners.

As described earlier, the following effects may be observed according to this embodiment.

(1) The slot 3 may be formed approximately in the shape of a triangle so that the width of the rotor tooth 4 between adjacent slots 3 increases towards the center of the rotor core 1a. Therefore, the width in the circumferential direction of the rotor teeth 4 is gradually extended towards the center of the rotor core 1a. Accordingly, the density of magnetic flux of the rotor teeth 4 may be reduced towards the center of the rotor core 1a, thereby distributing magnetic saturation. Hence, the efficiency of motor performance may be enhanced.

(2) The width in the radial direction L of the bridge 8 between the rotor tooth 4 and the outer peripheral edge of the rotor core 1a may be fixed. This may help to reduce the amount of magnetic flux leakage from the rotor core 1a from the peripheral portion. Hence, operation efficiency may be improved.

(3) The width in the circumferential direction K of the slot 3 on the outer peripheral side may be wider than the width in the circumferential direction S of the slot opening of the slot 2a of the stator 2. This may help to reduce the amount of magnetic flux leakage (a portion of magnetic flux generated by the winding of the stator 2 that does not link to the slot 3 of the rotor 1). Hence, magnetic flux may be used effectively.

(4) The portion having the fixed width L in the radial direction of the bridge 8 may be wider than the width in the circumferential direction S of the slot opening of the stator 2. This may contribute to a further effective use of magnetic flux.

(5) The slot 3 formed to include the opening 3d may help to reduce the amount of magnetic flux leakage (a portion of magnetic flux generated by the winding of the stator 2 that does not link to the slot 3 of the rotor 1). This may contribute to an effective use of magnetic flux. Hence, the efficiency of motor performance may be improved.

(6) The slot 3 with acute-angled corners may be modified to have rounded corners on both sides on the outer peripheral side of the rotor core 1a. This may improve the punching performance of a die, thereby enhancing productivity. This may also help to improve filing efficiency for the slot 3 when filled with a nonmagnetic and conductive material (e.g., aluminum, copper, etc.) without angular corners. Additionally, this may also help to further concentrate portions under magnetic saturation conditions. Hence, the efficiency of motor performance may be further improved.

Embodiment 4

A single phase induction motor driven at a constant rate by a single phase power source has locked-rotor torque smaller than a three phase induction motor. Therefore, there is a high demand for improving locked-rotor torque. Starting current is larger than rated current in the case of an induction motor running at a constant rate. Therefore, the induction motor runs with the rotor teeth 4 under magnetic saturation conditions. The shapes of the slots 3 of the rotors 1 described in the first embodiment to the third embodiment may contribute to concentrating magnetic saturation to the outer peripheral portion of the rotor core 1a, thereby reducing magnetic saturation at the inner side of the rotor teeth 4 (the center side of the rotor core 1a), and thereby improving locked-rotor torque. The shapes of the slots 3 of the rotors 1 may therefore be effective on a single phase induction motor.

If an induction motor using any one of the rotors 1 described in the first embodiment to the third embodiment is used in a compressor, fan, etc., then the efficiency of the compressor, fan, etc. may be improved. If the compressor, fan, etc. is then used in an air conditioner, the efficiency of the air conditioner may be improved.

BRIEF DESCRIPTION OF THE DRAWINGS

FIG. 15 An enlarged partial top view of the rotor core 1a illustrating an outer peripheral portion (including the stator 2), according to the third embodiment.

FIG. 16 An enlarged partial top view of the slot 3 of the rotor core 1a formed approximately in the shape of a triangle so that the width of the rotor tooth 4 between adjacent slots 3 increases towards the center of the rotor core 1a, as a variant example, according to the third embodiment.

FIG. 17 An enlarged partial top view of the slot 3 of the rotor core 1a formed approximately in the shape of a triangle so that the width of the rotor tooth 4 between adjacent slots 3 increases towards the center of the rotor core 1a, as a variant example, according to the third embodiment.

Figure 1:
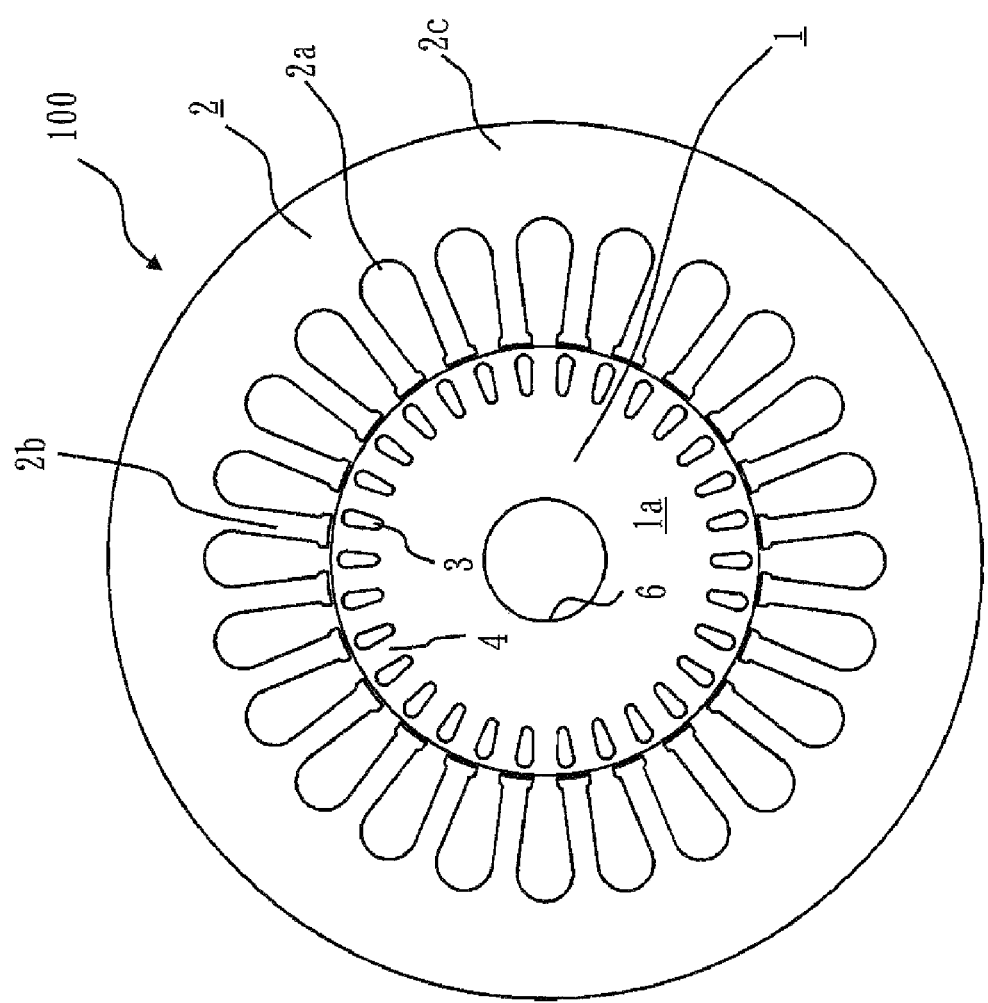
FIG. 1 A cross section of a rotor 1 (including a stator 2) of a conventional induction motor 100 for the purpose of comparison.
Figure 2:
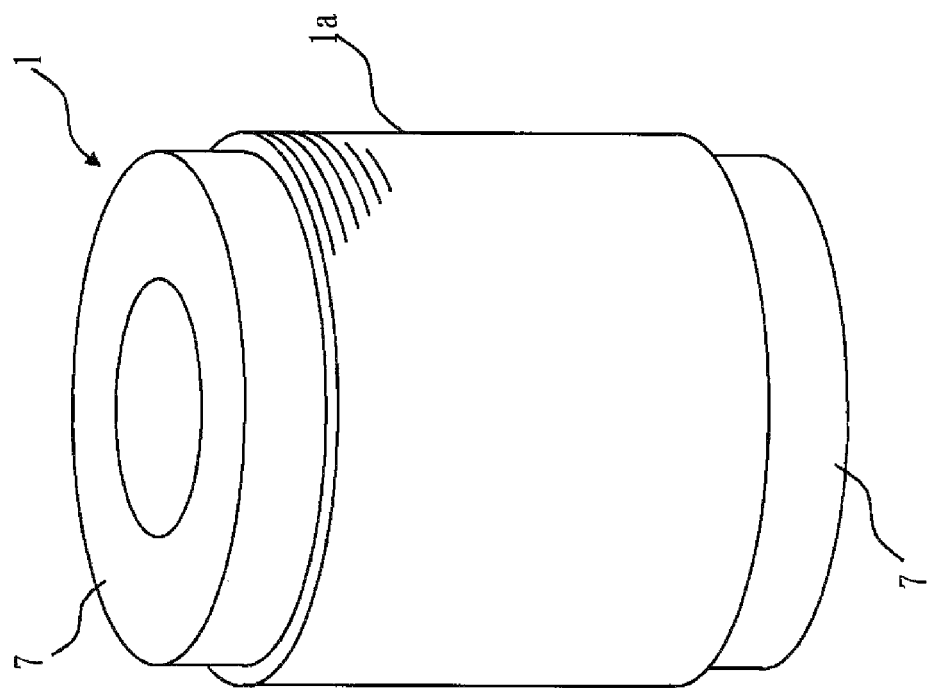
FIG. 2 A perspective view of the rotor 1 of the conventional induction motor 100 where slots are filled with a nonmagnetic and conductive material (e.g., aluminum, copper, etc.) by die-casting or the like, and end rings are fitted at the end portions of the rotor 1, for the purpose of comparison.
Figure 3:
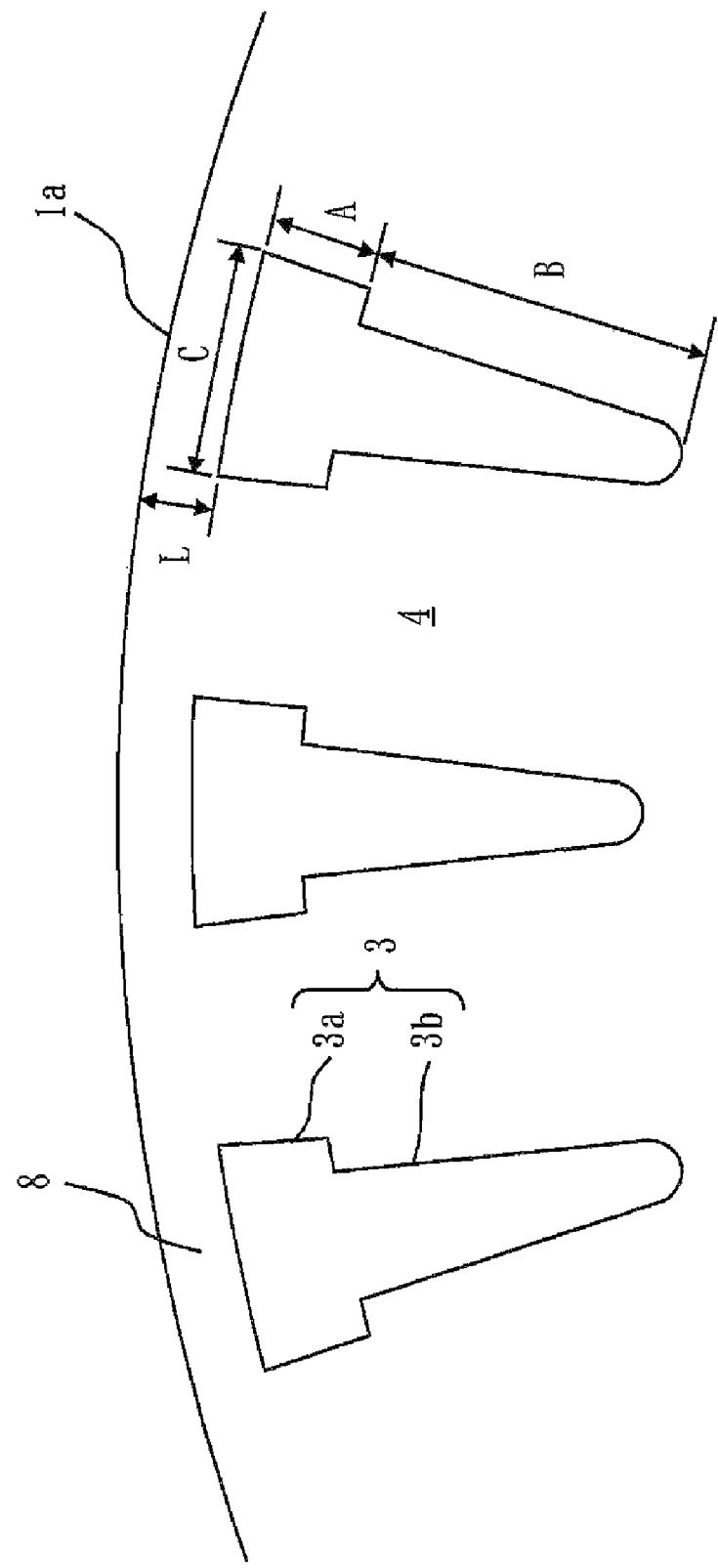
FIG. 3 An enlarged peripheral top view of a slot 3 formed in the shape of a T of a rotor core 1a, according to a first embodiment.
Figure 4:
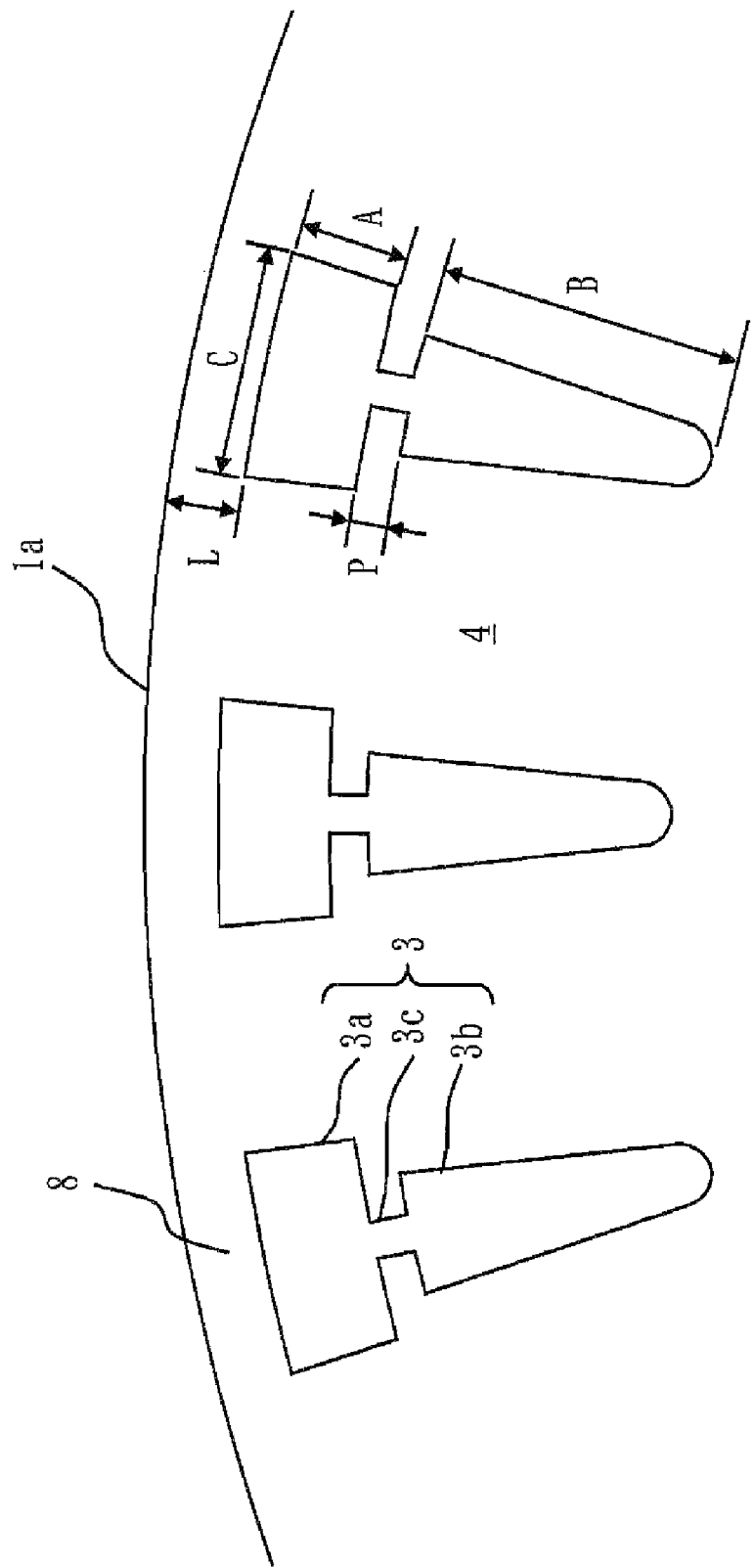
FIG. 4 An enlarged partial top view of the slot 3 formed in the shape of a double squirrel-cage, according to the first embodiment.
Figure 5:
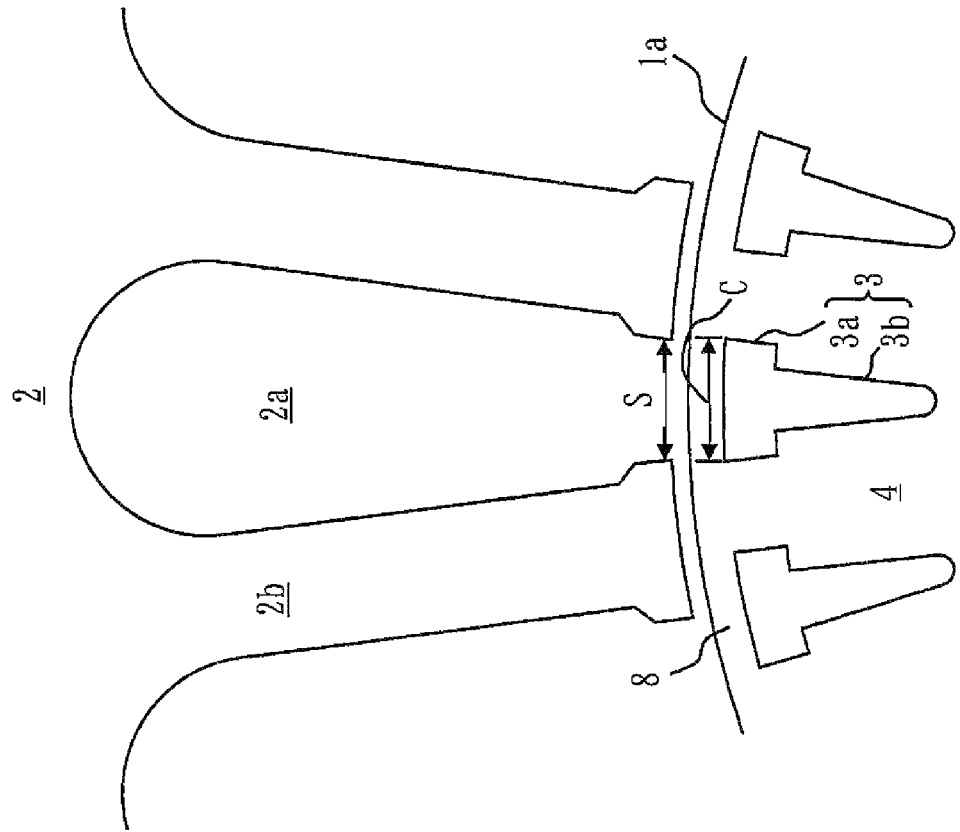
FIG. 5 An enlarged partial top view of the rotor core 1a illustrating an outer peripheral portion (including the stator 2), according to the first embodiment.
Figure 6:
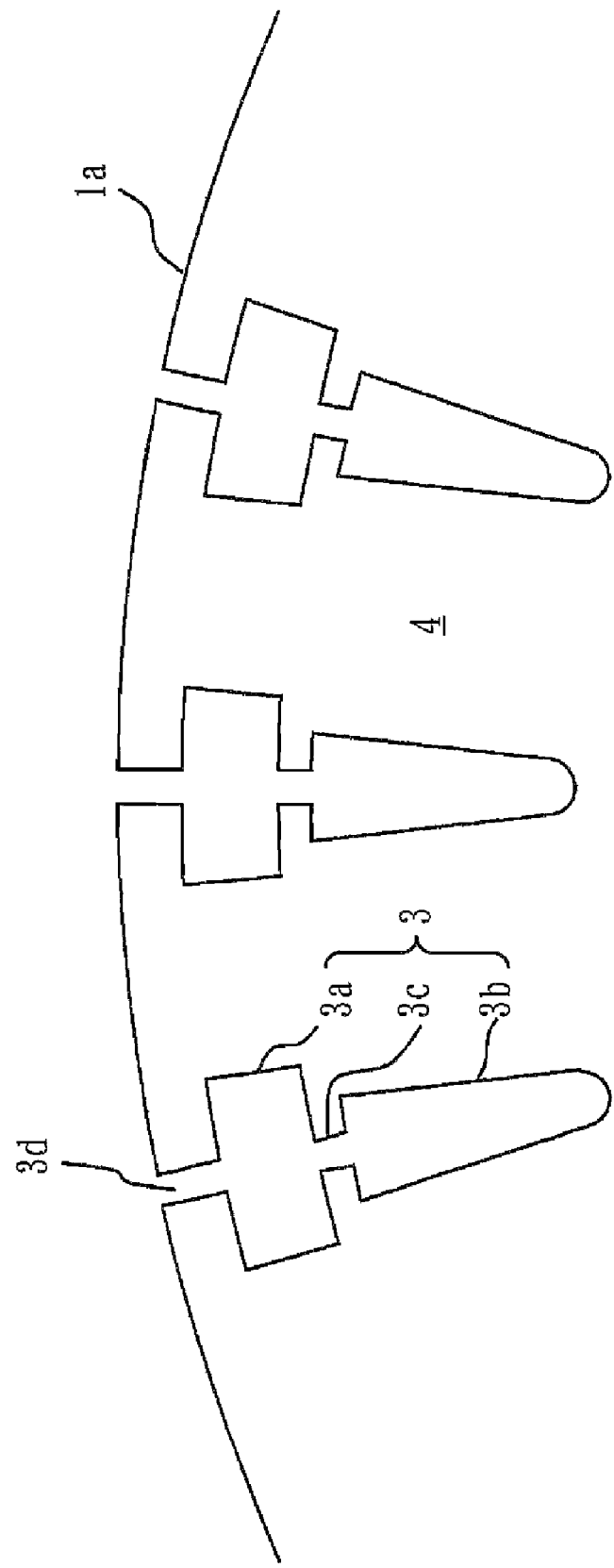
FIG. 6 An enlarged partial top view of the slot 3 formed in the shape of a double squirrel-cage, according to the first embodiment.
Figure 7:
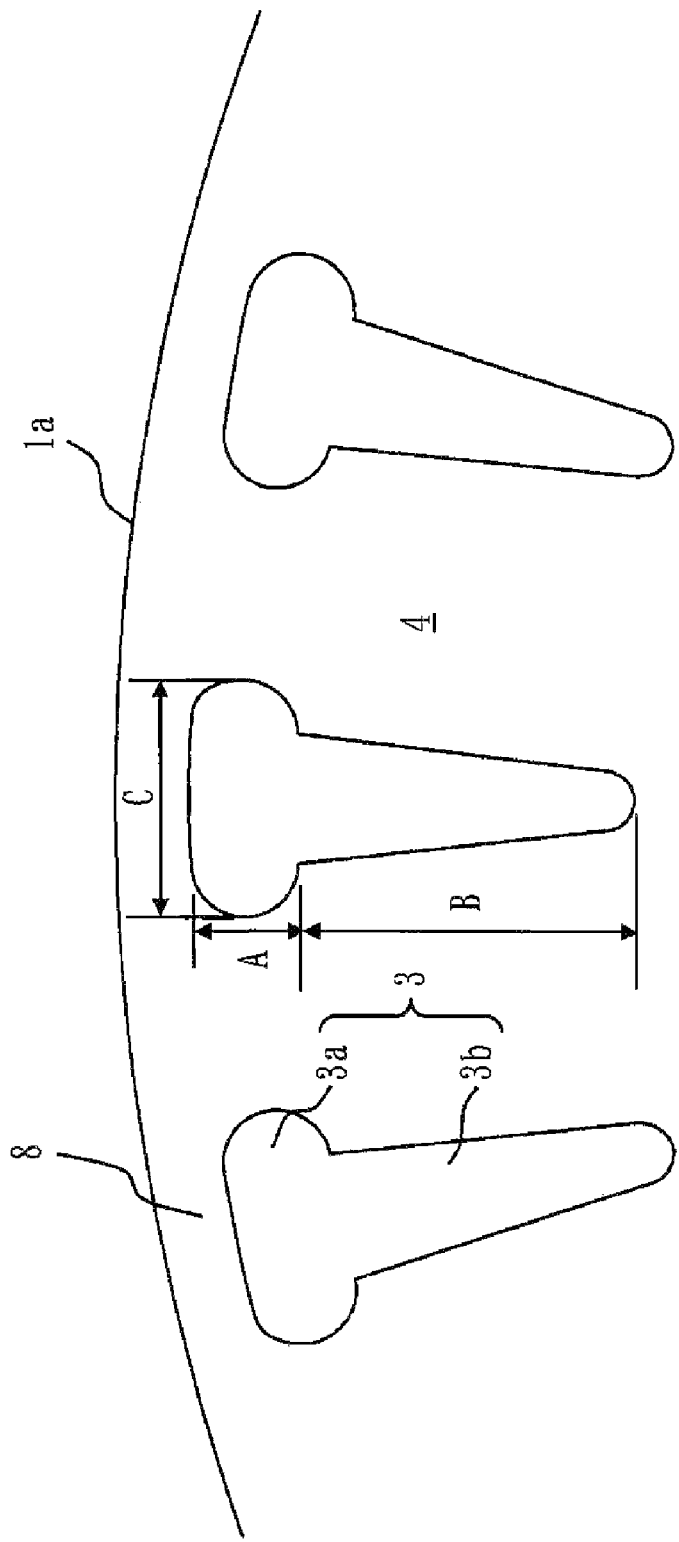
FIG. 7 An enlarged partial top view of the slot 3 formed in the shape of a T of the rotor core 1a, as a variant example, according to the first embodiment.
Figure 8:
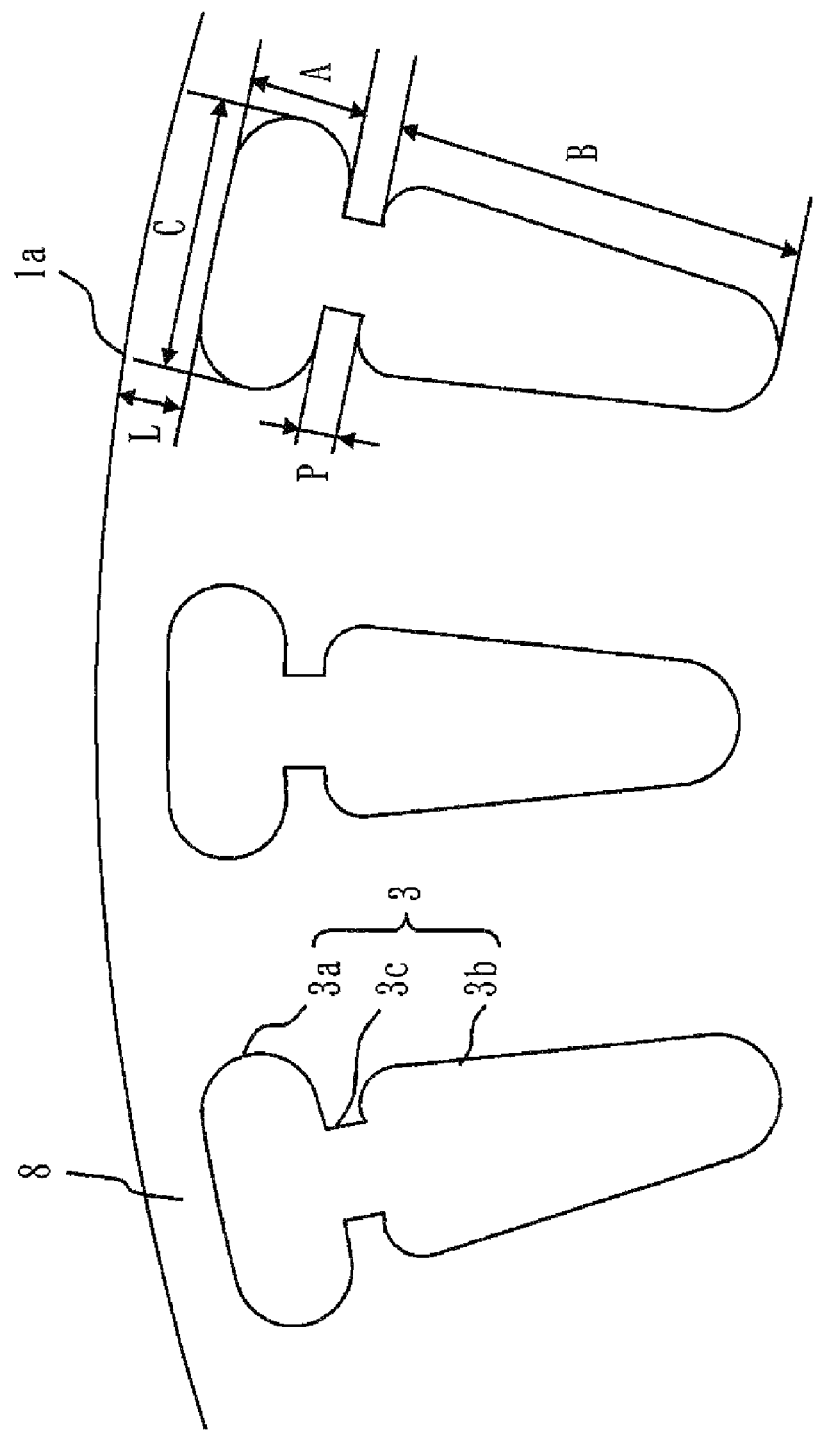
FIG. 8 An enlarged partial top view of the slot 3 formed in the shape of a double squirrel-cage, as a variant example, according to the first embodiment.
Figure 9:
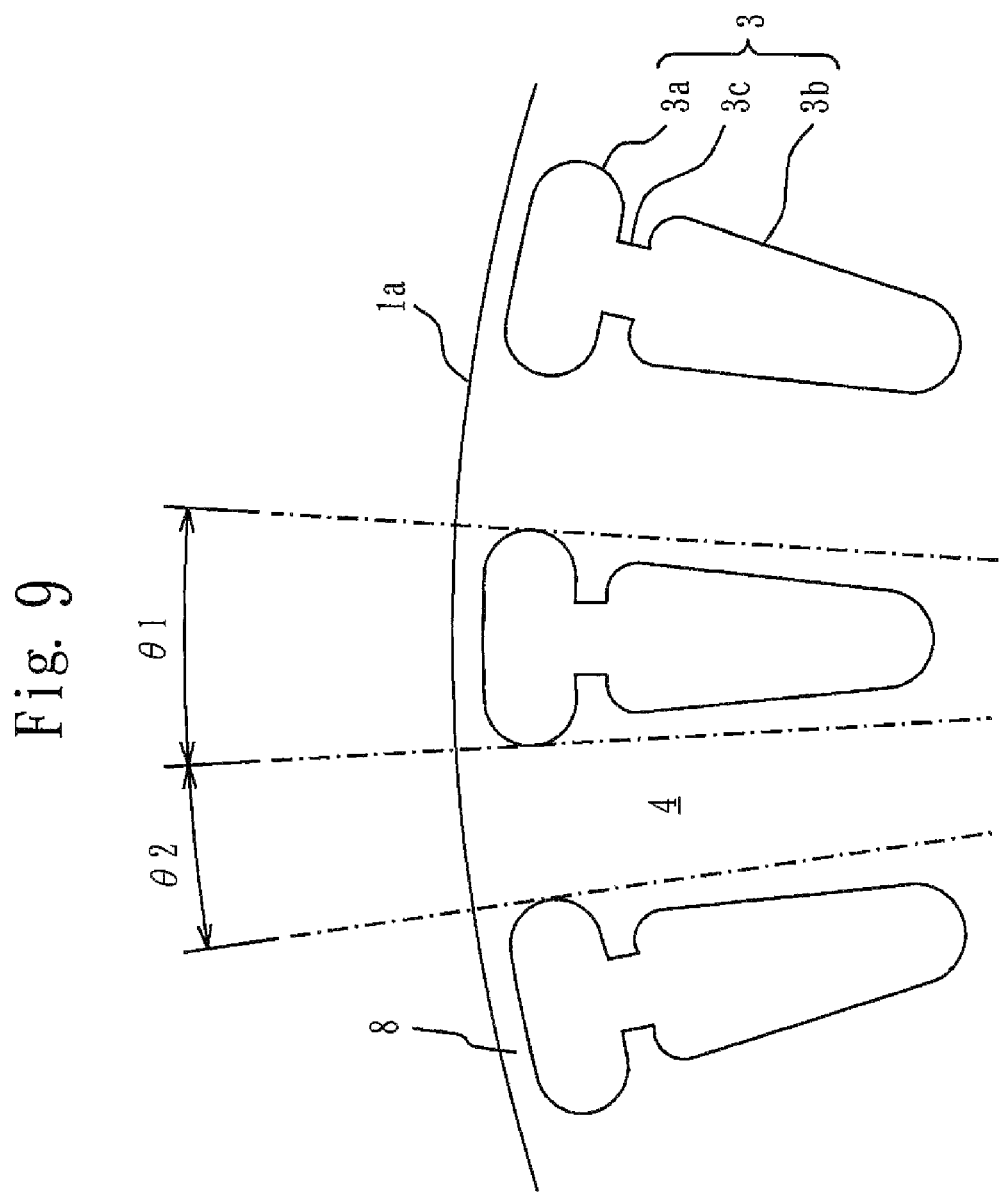
FIG. 9 An enlarged partial top view of the slot 3 formed in the shape of a double squirrel-cage for more detail, according to the first embodiment.
Figure 10:
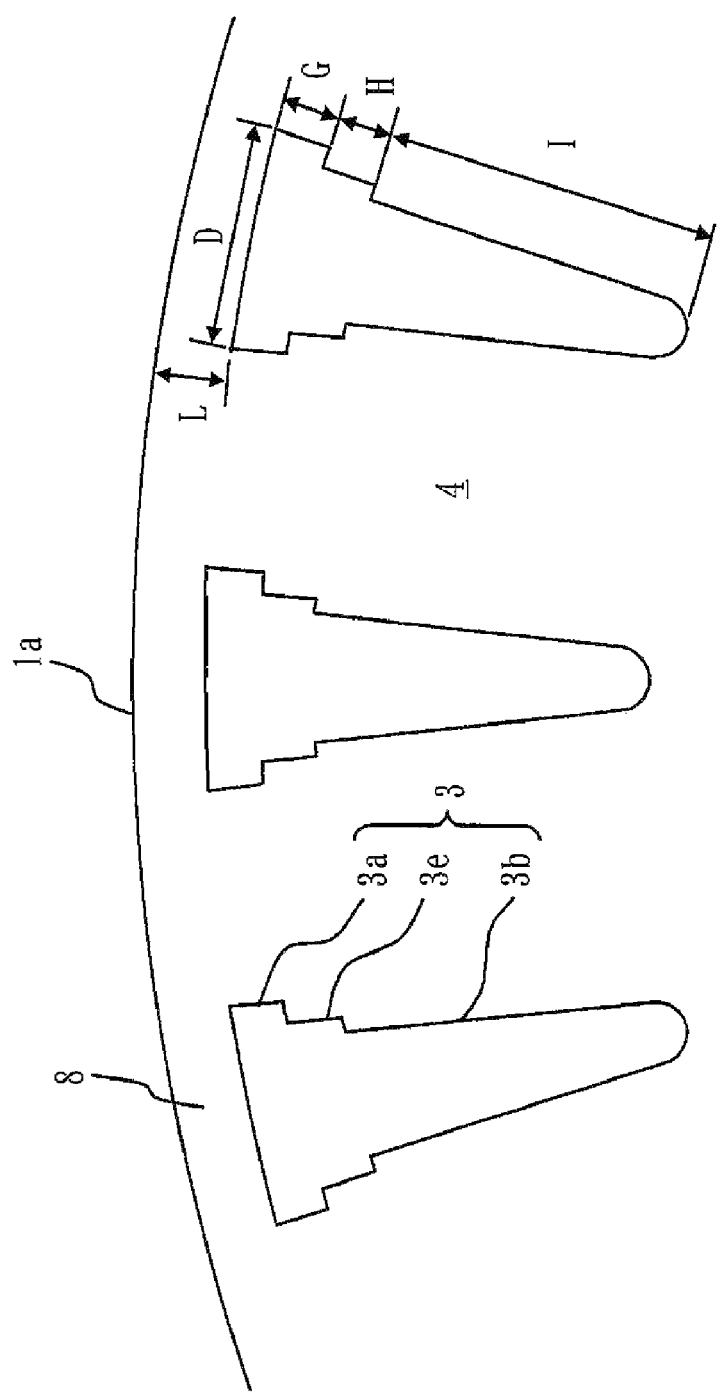
FIG. 10 An enlarged partial top view of the slot 3 of the rotor core 1a, including a top slot, a middle slot, and a bottom slot, according to a second embodiment.
Figure 11:
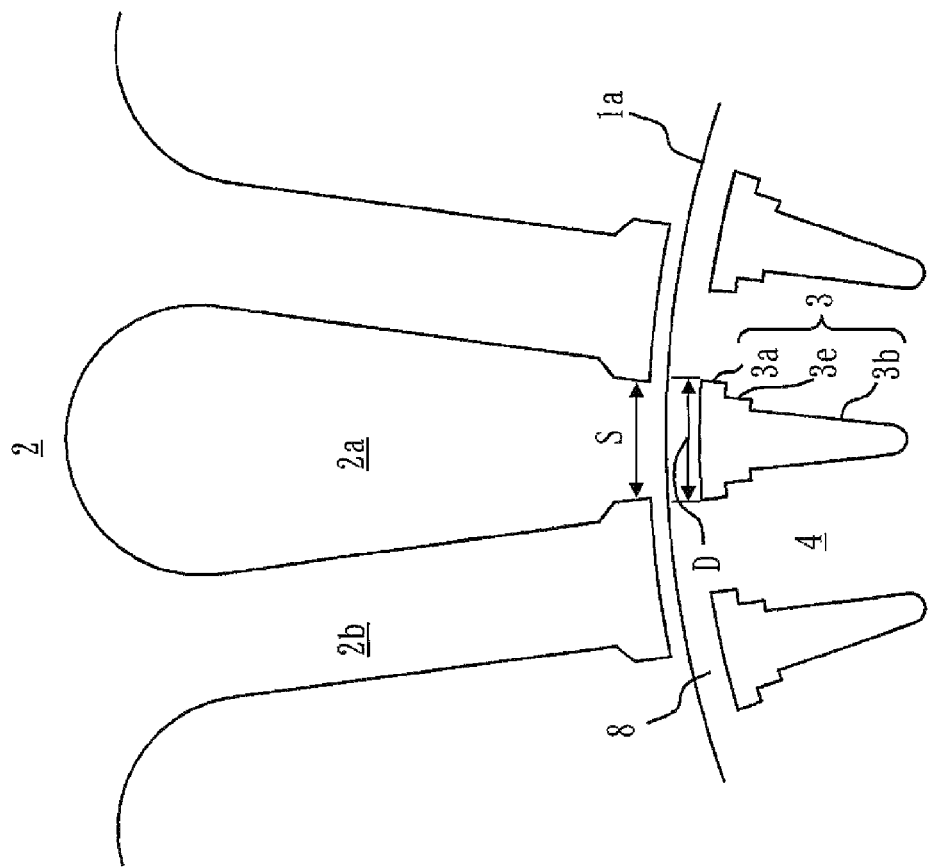
FIG. 11 An enlarged partial top view of the rotor core 1a illustrating an outer peripheral portion (including the stator 2), according to the second embodiment.
Figure 12:
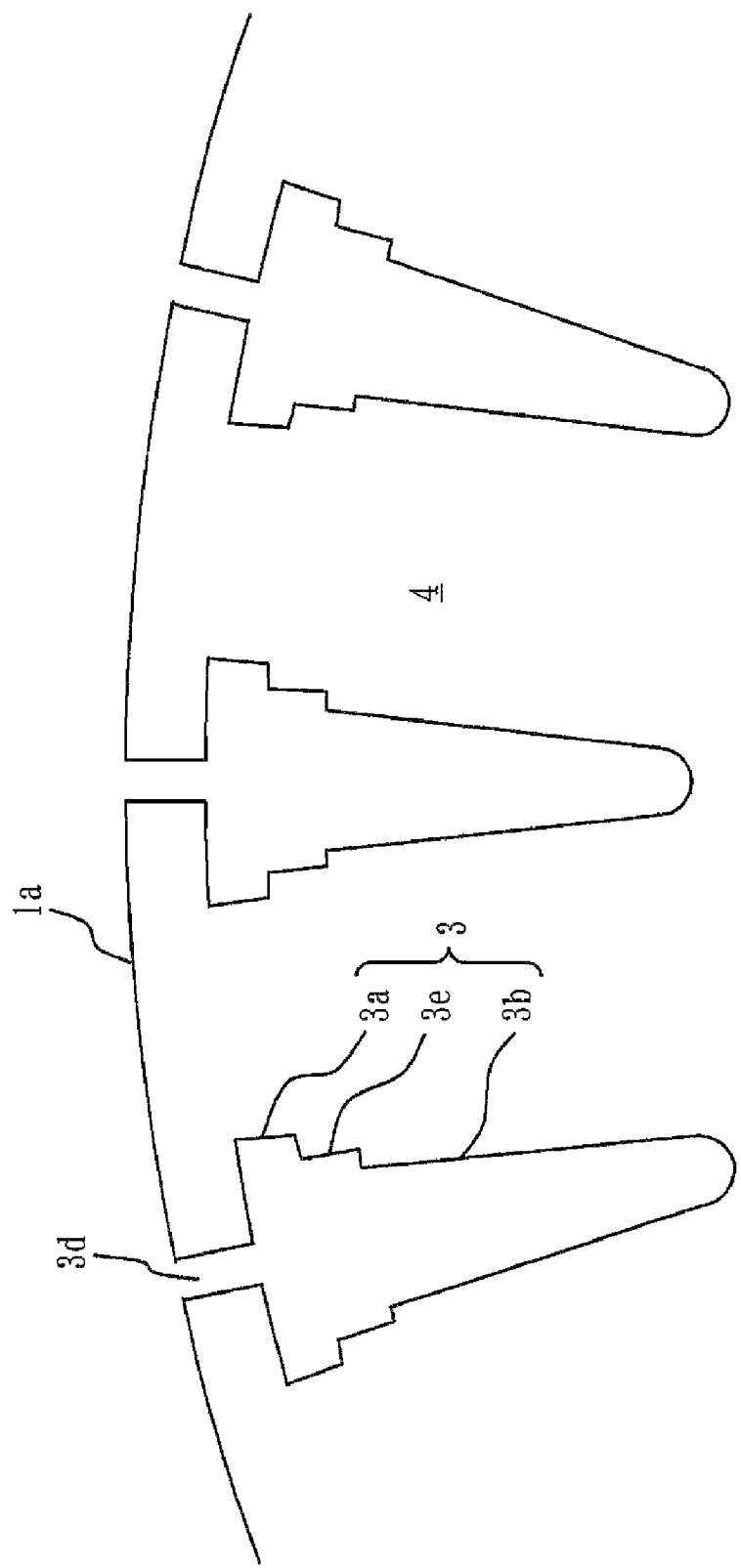
FIG. 12 An enlarged partial top view of the slot 3 of the rotor core 1a, including a top slot, a middle slot and a bottom slot, as a variant example, according to the second embodiment.
Figure 13:
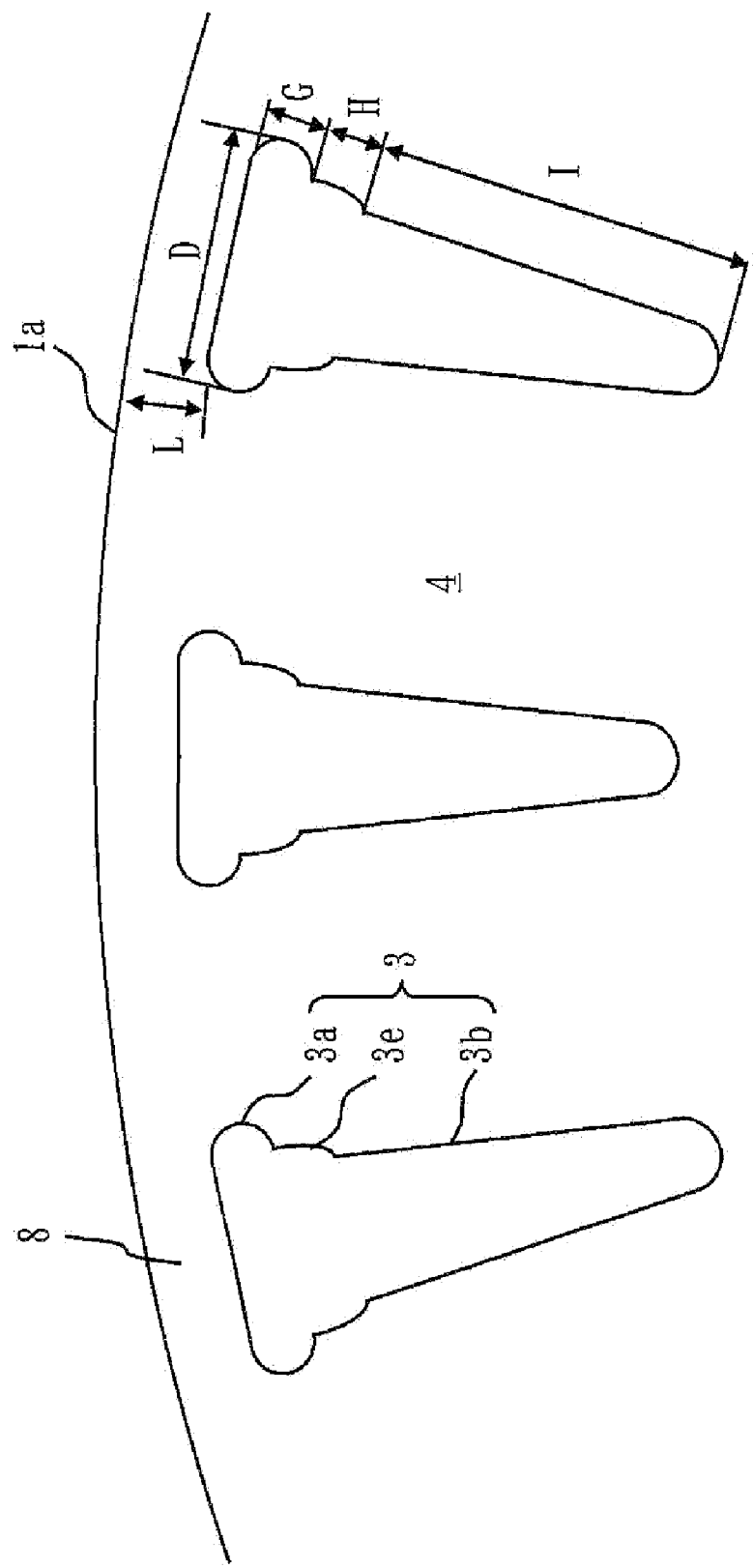
FIG. 13 An enlarged partial top view of the slot 3 of the rotor core 1a, including a top slot, a middle slot and a bottom slot, as another variant example, according to the second embodiment.
Figure 14:
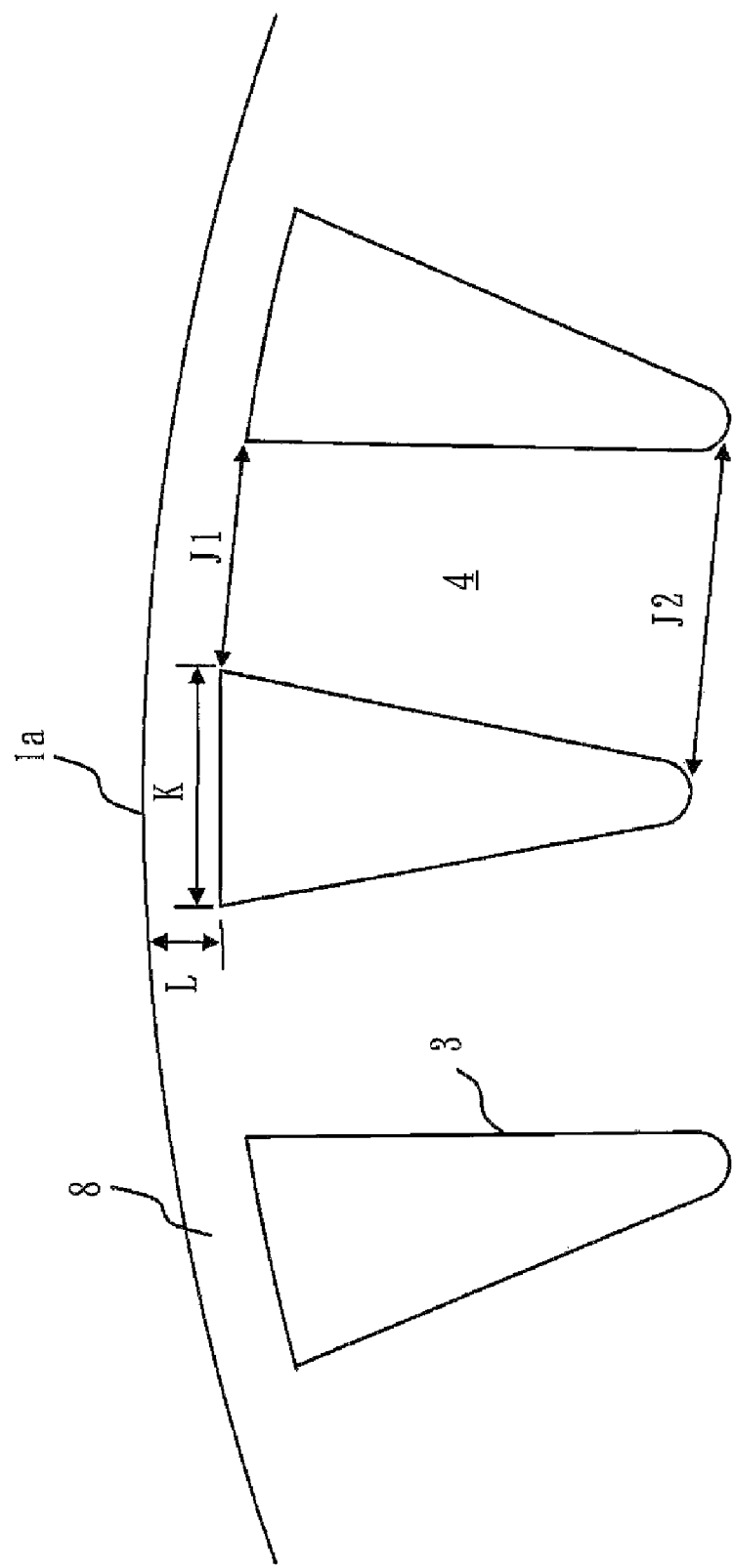
FIG. 14 An enlarged partial top view of the slot 3 of the rotor core 1a formed approximately in the shape of a triangle so that the width of a rotor tooth 4 between adjacent slots 3 increases towards the center of the rotor core 1a, according to a third embodiment.

EXPLANATION OF REFERENCE NUMERALS 1 rotor
1a rotor core
2 stator
2a slot
2b teeth
2c core back
3 slot
3a top slot
3b bottom slot
3c leakage slot
3d opening
3e middle slot
4 rotor teeth
6 shaft hole
7 end ring
8 bridge
100 induction motor

The invention claimed is:

1. An induction motor rotor comprising:
a rotor core with slots formed therein, and
a squirrel-cage secondary conductor including a nonmagnetic and conductive material filled in each of the slots of the rotor core,
wherein each of the slots is formed to include a top slot, a middle slot, and a bottom slot, each of which communicates with an adjacent layer slot;
wherein a relation among a width in the circumferential direction of the top slot, a width in the circumferential direction of the middle slot, and a width in the circumferential direction of the bottom slot is defined as: width in the circumferential direction of the top slot>width in the circumferential direction of the middle slot>width in the circumferential direction of the bottom slot, and
wherein a relation among a width in the circumferential direction of the rotor tooth between adjacent top slots, a width in the circumferential direction of the rotor tooth between adjacent middle slots, and a width in the circumferential direction of the rotor tooth between adjacent bottom slots is defined as: maximum width in the circumferential direction of the rotor tooth between adjacent top slots<minimum width in the circumferential direction of the rotor tooth between adjacent middle slots and maximum width in the circumferential direction of the rotor tooth between adjacent middle slots<minimum width in the circumferential direction of the rotor tooth between adjacent bottom slots.

2. The induction motor rotor according to claim 1, wherein G is defined as a width in the radial direction of the top slot, H is defined as a width in the radial direction of the middle slot, I is defined as a width in the radial direction of the bottom slot, and $G+H<0.5I$.

* * * * *